(12) United States Patent
Mishuku

(10) Patent No.: US 7,483,817 B2
(45) Date of Patent: Jan. 27, 2009

(54) TEST METHOD, TEST PROGRAM, AND TEST DEVICE OF DATA PROCESSING SYSTEM

(75) Inventor: Masaru Mishuku, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/516,786

(22) Filed: Sep. 7, 2006

(65) Prior Publication Data
US 2007/0288189 A1    Dec. 13, 2007

(30) Foreign Application Priority Data
Jun. 12, 2006    (JP)    ............................. 2006-161911

(51) Int. Cl.
*G06F 19/00*    (2006.01)
(52) U.S. Cl. .................... 702/186; 702/123; 714/37; 714/43
(58) Field of Classification Search .................. None
See application file for complete search history.

(56) References Cited

U.S. PATENT DOCUMENTS

| | | | |
|---|---|---|---|
| 4,759,021 A * | 7/1988 | Kawaguchi et al. | 714/743 |
| 5,007,026 A * | 4/1991 | Gaultier et al. | 365/185.04 |
| 5,419,858 A | 5/1995 | Hata et al. | 264/40.5 |
| 5,787,270 A * | 7/1998 | Bloomer et al. | 714/8 |
| 6,477,483 B1 * | 11/2002 | Scarlat et al. | 702/186 |
| 6,907,548 B2 * | 6/2005 | Abdo | 714/43 |
| 2004/0015317 A1 * | 1/2004 | Klotz et al. | 702/123 |
| 2004/0078718 A1 * | 4/2004 | Sato et al. | 714/43 |
| 2005/0096877 A1 | 5/2005 | Shimazaki et al. | 702/186 |

FOREIGN PATENT DOCUMENTS

| | | |
|---|---|---|
| JP | 5-147090 | 6/1993 |
| JP | 8-16531 | 1/1996 |
| JP | 2004-302847 | 10/2004 |
| JP | 2005-135130 | 5/2005 |

* cited by examiner

*Primary Examiner*—Manuel L Barbee
(74) *Attorney, Agent, or Firm*—Staas & Halsey LLP

(57) ABSTRACT

A connection characteristics determination unit determines whether connection mechanisms provided in a data processing system have differences in connection characteristics in terms of hardware implementation or not. If there is no difference in the connection characteristics of the connection mechanisms, a first load test execution unit determines, for all processors, a load test combination program of a test program and a load program having a load effect, and allocates them to the processors so as to execute a load test. If there is a difference in the connection characteristics of the connection mechanisms, a second load test execution unit determines, for each of a plurality of processor groups sorted in accordance with the difference of the connection characteristics, a load test combination program of a test program and a load program having a load effect, and allocates them to a plurality of processors so as to execute a load test.

16 Claims, 36 Drawing Sheets

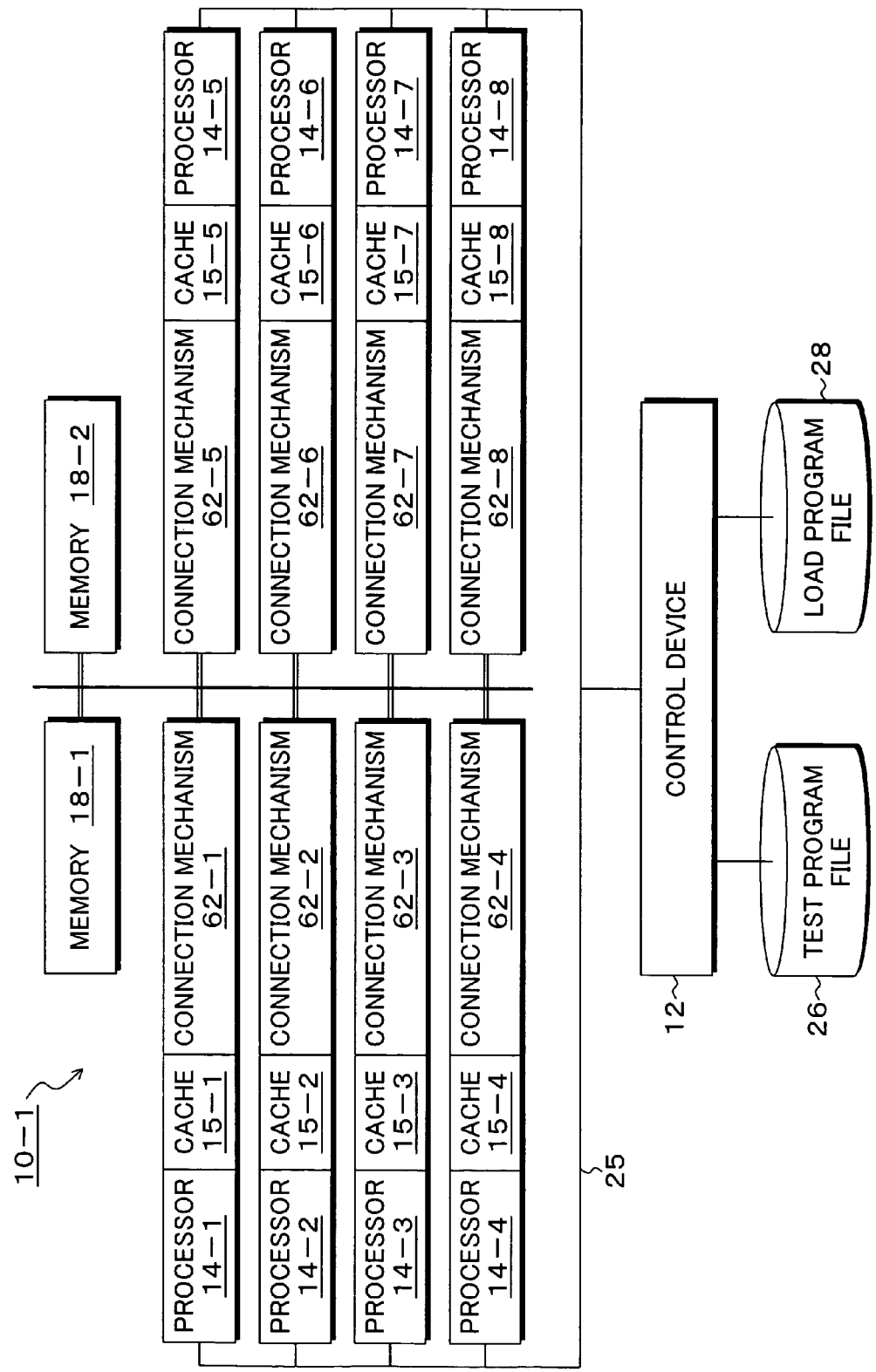

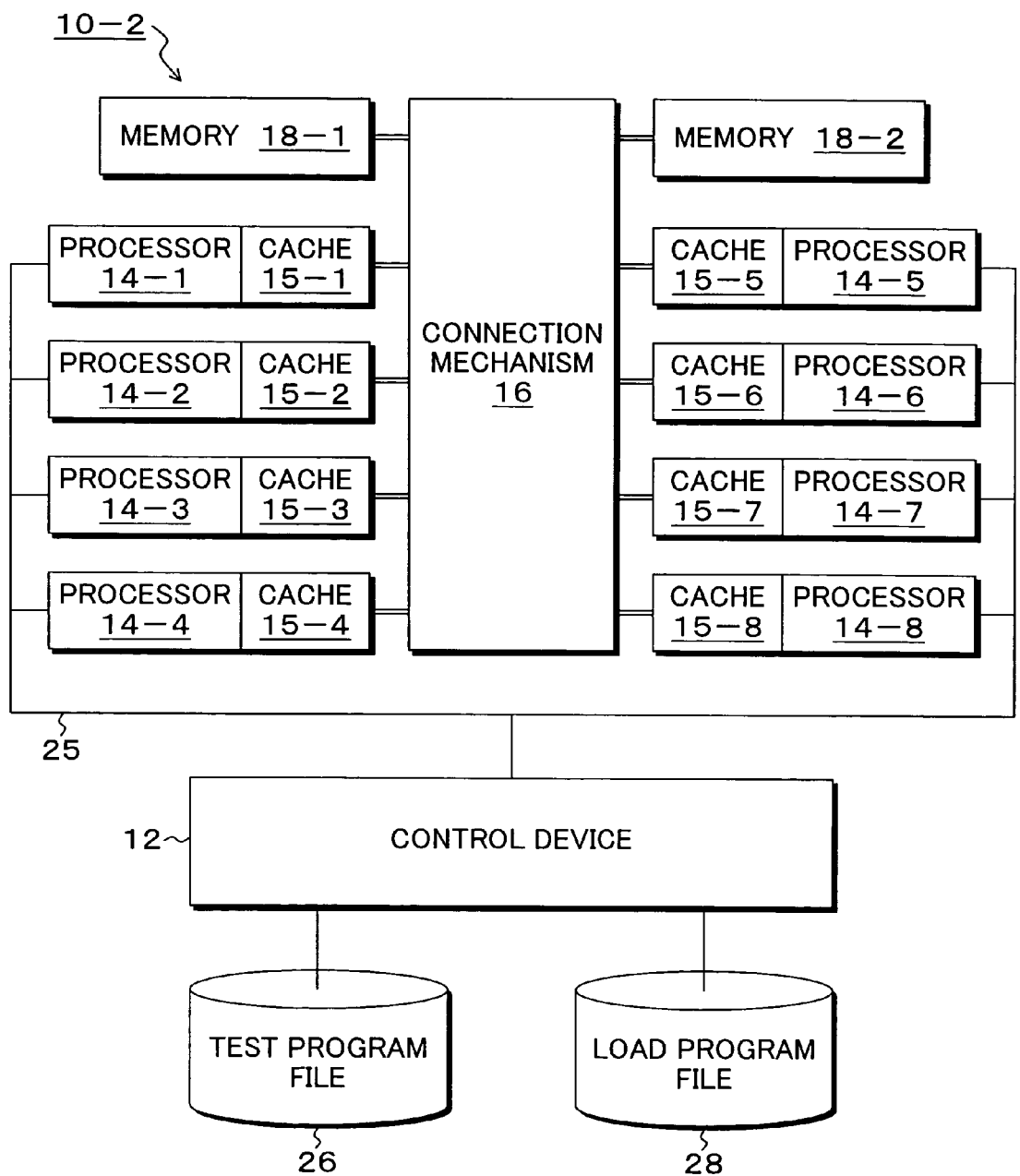

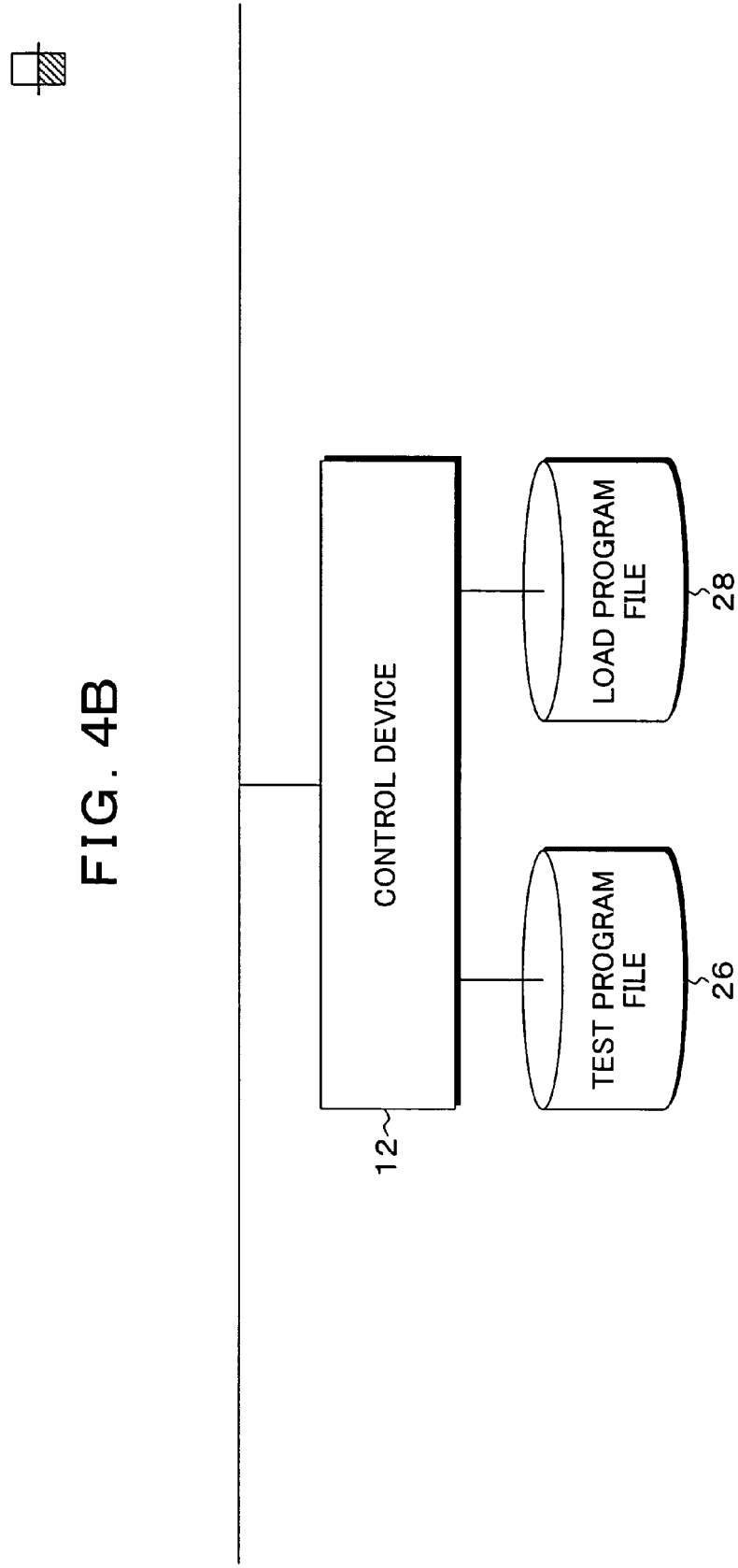

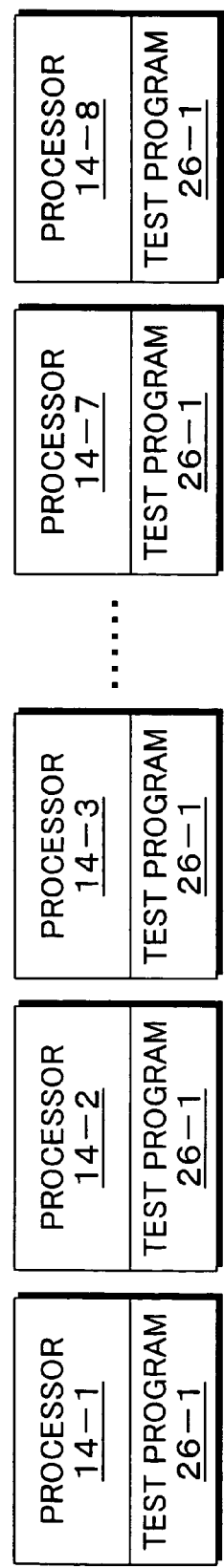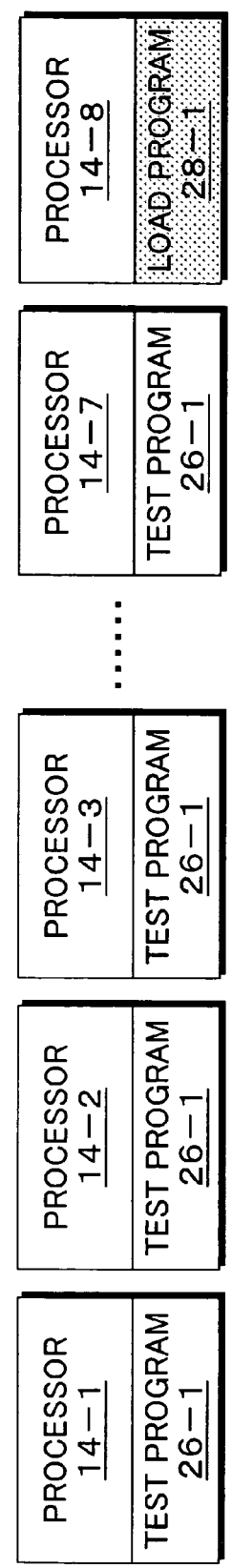

FIG. 8

| TEST PROGRAM | INDEPENDENT EXECUTION TIME | LOAD PROGRAM | COMBINATION EXECUTION TIME | PRIORITY |
|---|---|---|---|---|
| 26-1 | T1 | 28-1 | T11 | 1 |
| | | 28-2 | T12 | NOT EFFECTIVE |
| | | 28-3 | T13 | 4 |
| 26-2 | T2 | 28-1 | T21 | 2 |
| | | 28-2 | T22 | 7 |
| | | 28-3 | T23 | 5 |
| 26-3 | T3 | 28-1 | T31 | 3 |
| | | 28-2 | T32 | 8 |
| | | 28-3 | T33 | 6 |

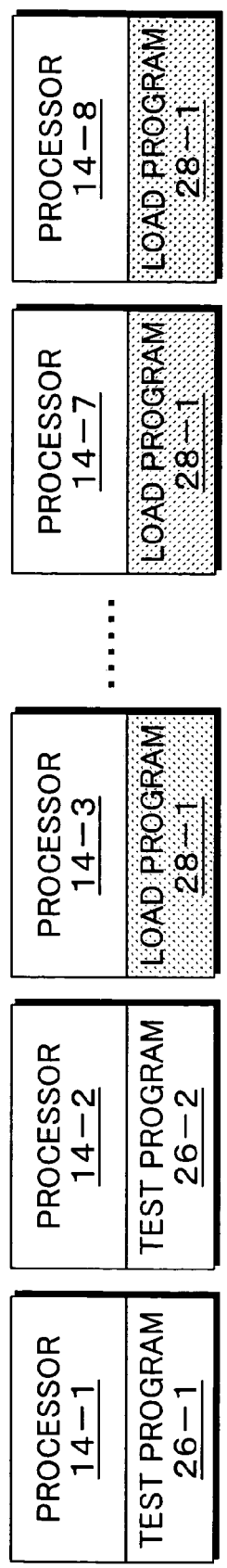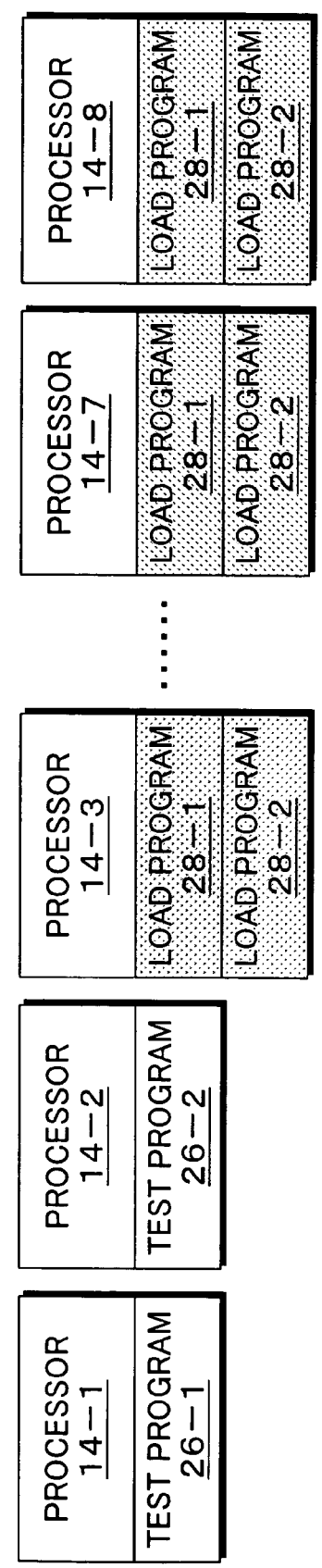

FIG. 14

| PROCESSOR | INDEPENDENT EXECUTION TIME |
|---|---|
| 14-1 | T1 |
| 14-2 | T2 |
| 14-3 | T3 |
| 14-4 | T4 |
| 14-5 | T5 |
| 14-6 | T6 |
| 14-7 | T7 |
| 14-8 | T8 |
| ⋮ | ⋮ |
| 14-16 | T16 |

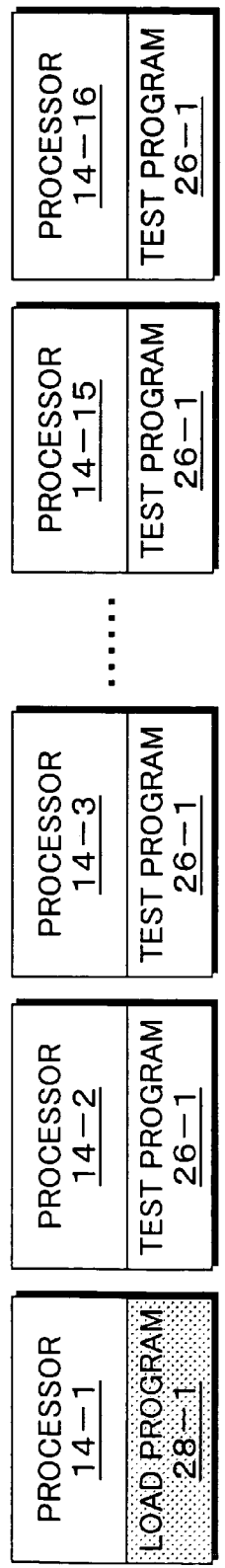
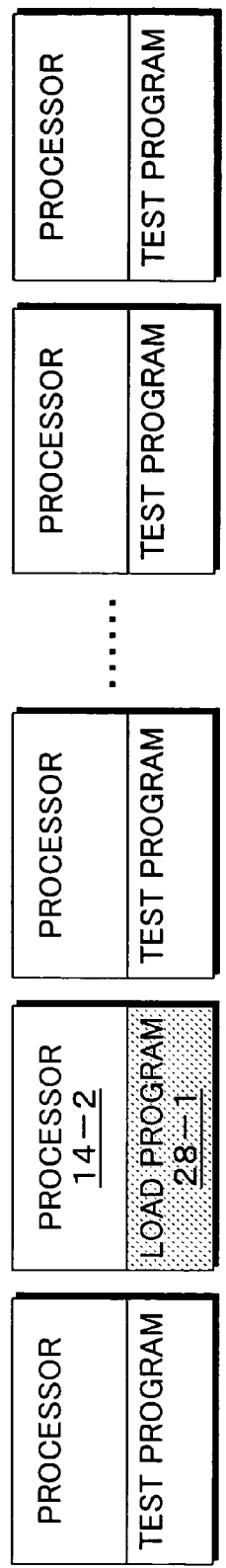
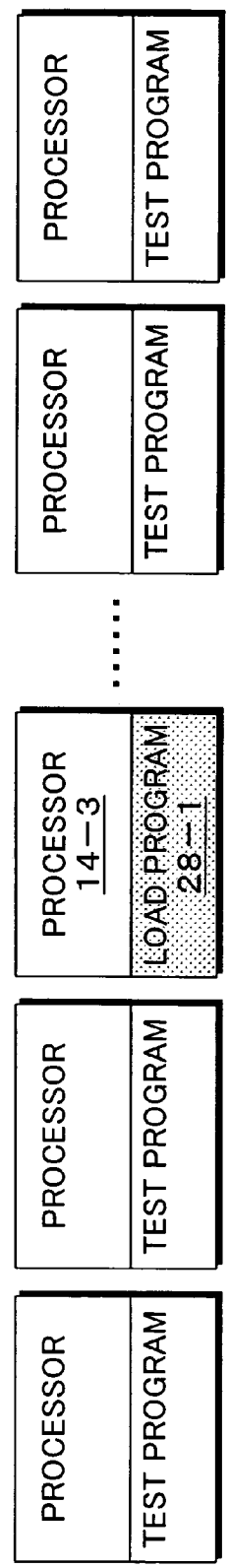
FIG. 15A
FIG. 15B
FIG. 15C

FIG. 16

LOAD PROGRAM EXECUTING PROCESSOR

| | 14-1 | 14-2 | 14-3 | 14-4 | 14-5 | 14-6 | 14-7 | 14-8 | | 14-16 |
|---|---|---|---|---|---|---|---|---|---|---|
| 14-1 | ... | T2-1 | T3-1 | T4-1 | T5-1 | T6-1 | T7-1 | T8-1 | | T16-1 |
| 14-2 | T1-2 | ... | T3-2 | T4-2 | T5-2 | T6-2 | T7-2 | T8-2 | | T16-2 |
| 14-3 | T1-3 | T2-3 | ... | T4-3 | T5-3 | T6-3 | T7-3 | T8-3 | | T16-3 |
| 14-4 | T1-4 | T2-4 | T3-4 | ... | T5-4 | T6-4 | T7-4 | T8-4 | | T16-4 |
| 14-5 | T1-5 | T2-5 | T3-5 | T4-5 | ... | T6-5 | T7-5 | T8-5 | | T16-5 |
| 14-6 | T1-6 | T2-6 | T3-6 | T4-6 | T5-6 | ... | T7-6 | T8-6 | | T16-6 |
| 14-7 | T1-7 | T2-7 | T3-7 | T4-7 | T5-7 | T6-7 | ... | T8-7 | | T16-7 |
| 14-8 | T1-8 | T2-8 | T3-8 | T4-8 | T5-8 | T6-8 | T7-8 | ... | | T16-8 |
| 14-16 | T1-16 | T2-16 | T3-16 | T4-16 | T5-16 | T6-16 | T7-16 | T8-16 | | ... |

TEST PROGRAM EXECUTING PROCESSOR

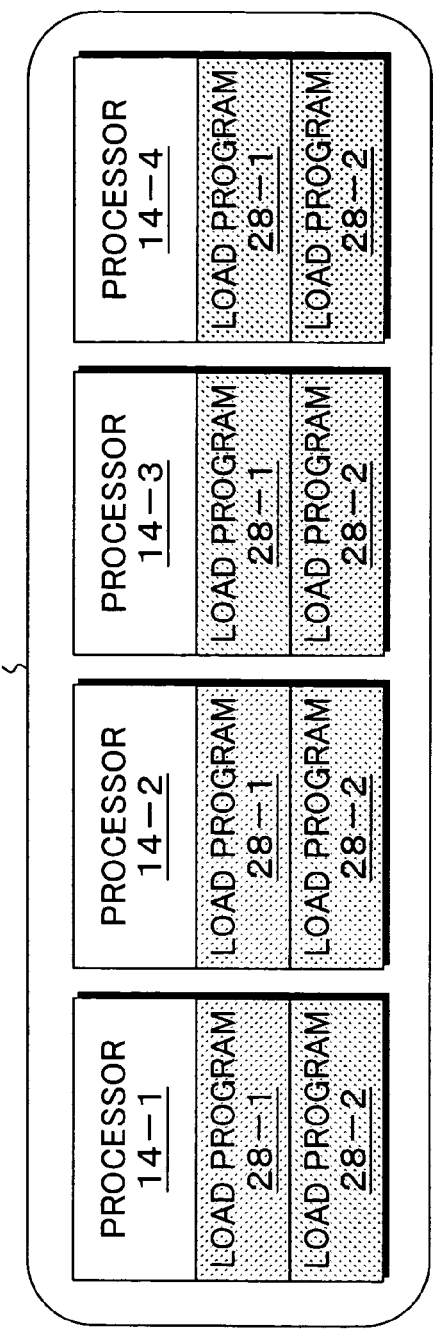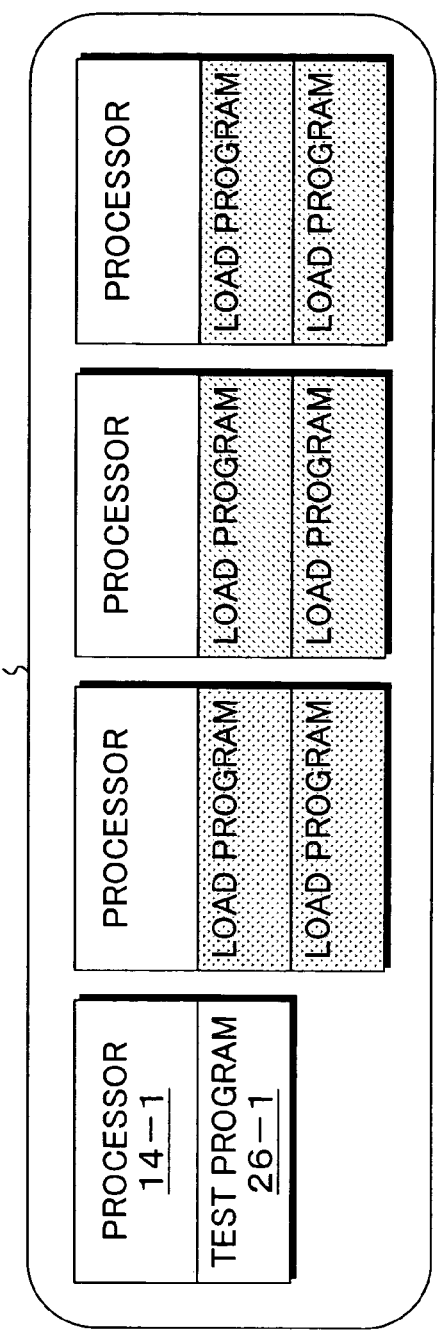
FIG. 21A
FIG. 21B

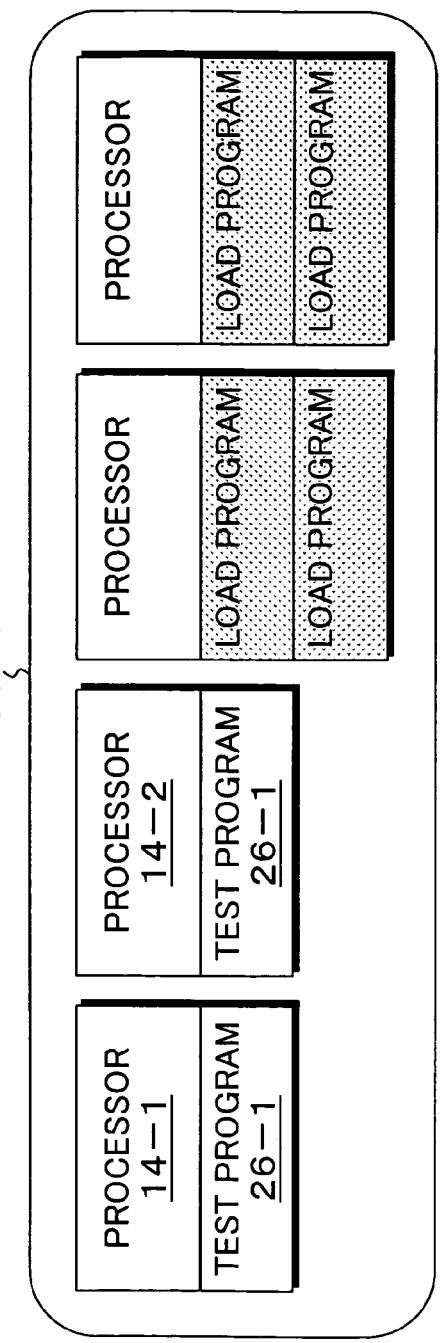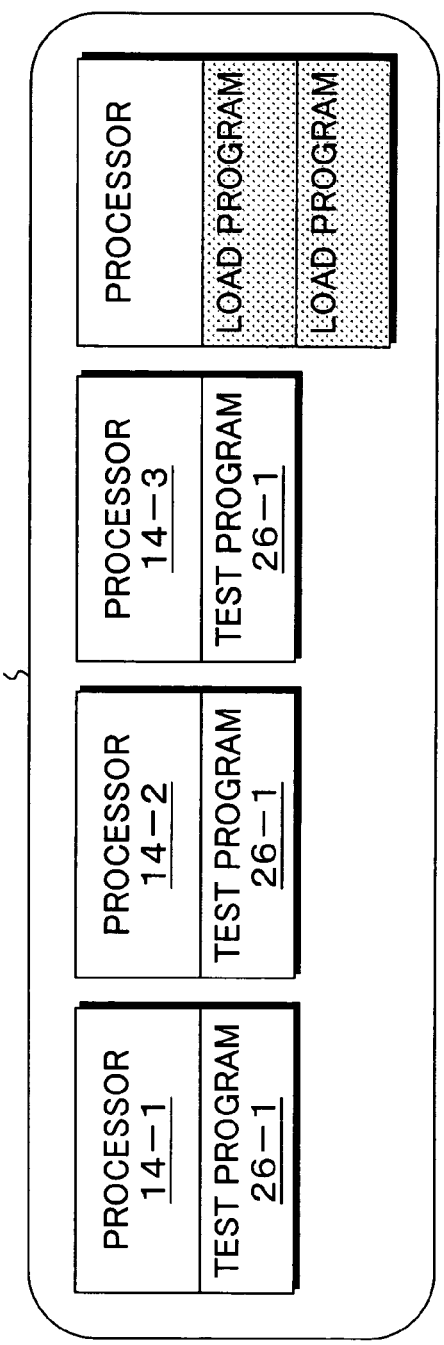
FIG. 21C
FIG. 21D

TEST METHOD, TEST PROGRAM, AND TEST DEVICE OF DATA PROCESSING SYSTEM

This application is a priority based on prior application No. JP 2006-161911, filed Jun. 12, 2006, in Japan.

BACKGROUND OF THE INVENTION

1. Field of the Invention

The present invention relates to a test method, a test program, and a test device of a data processing system which is formed as a symmetric multiprocessor which logically equivalently accesses shared devices such as memories by a plurality of processors, and particularly relates to a test method, a test program, and a test device of a data processing system which determines a combination of a test program and a load program having a high load effect and performs a long-time load test in order to examine the operation of connection mechanisms.

2. Description of the Related Arts

Conventionally, in a data processing system known as a symmetric multiprocessor, a plurality of processors on which cache devices are mounted are mutually connected by one or plural connection mechanisms, and access can be made logically and symmetrically between memory devices disposed as shared devices and the cache devices provided in the processors via the connection mechanisms. In such a data processing system, a plurality of reference operations of data and data write operations from certain processors to memory devices, operations of referencing the data which is present in the cache devices of other processors, etc. may occur simultaneously. In this case, if operation requests from the processors are generated more than the simultaneous processing capability that the connection mechanisms have, the operation requests are temporarily caused to be in an execution waiting state and sequentially processed. A long-time load test is performed for such a data processing system in order to examine the operation of the connection mechanisms in accordance with needs for example when building the system. The load test for the connection mechanism for operation examination is executed by combining a test program which confirms validity of the data referenced by processors and a load program which outputs operation requests which are more than the simultaneous processing capability to the connection mechanisms along with execution of the test program to generate a loaded state. Therefore, the test program which examines the data referencing and write operations is designed in accordance with the logic specification of the processors, the load program is designed in accordance with the hardware implementation specification of the connection mechanisms, and a combination of the load program and the test program which is expected to have a load effect is determined based on intuition and experiences upon designing, so as to execute the load test.

However, since the combination of the test program and the load program has been determined based on intuition and experiences upon designing in such a conventional test method of a data processing system, the determined combination has not been ensured to be the best combination for the operation examination of the connection mechanism, and there has been a possibility that sufficient reliability may not be obtained for the operation examination of the connection mechanisms.

SUMMARY OF THE INVENTION

According to the present invention to provide a test method, a test program, and a test device of a data processing system which enable highly reliable operation examination of connection mechanisms in a short time by automatically determining a best combination of a test program and a load program having a high load effect and performing a long-time load test with the high load.

(Method)

The present invention provides a test method of a data processing device. In the present invention, the test method of the data processing system in which a plurality of processors are mutually connected by one or a plurality of connection mechanisms, the test method characterized by including a connection characteristics determination step in which whether the connection mechanisms have a difference in connection characteristics in terms of hardware implementation or not is determined;

a first load test execution step in which, if the connection characteristics of the connection mechanisms have no difference therebetween, a load test combination program in which a test program and a load program having a load effect are combined is determined for all the processors, so as to execute a long-time load test; and a second load test execution step in which, if the connection characteristics of the connection mechanisms have a difference therebetween, a load test combination program in which a test program and a load program having a load effect are combined is determined for each of a plurality of processor groups which are sorted in accordance with the difference of the connection characteristics, so as to execute a long-time load test.

Herein, the first load test execution step of the case in which the connection characteristics of the connection mechanisms have no difference therebetween includes a load test combination determination step in which execution time of a no-load state in which merely the test program is executed by all the processors is compared with execution time of a loaded state of the test program when the test program is executed by one of the processors and the load program is executed by all the remaining plural processors at the same time, wherein, if the execution time of the loaded state is longer than the execution time of the no-load state, the load program is determined to have a load effect, and a load test combination program in which the test program and the load program are combined is determined;

a tuning step in which, with respect to the load test combination program, one of the processors is caused to execute the test program, the remaining processors are caused to execute the load program while changing the number of the processors, the minimum number of the processors at which the execution time of the test program is saturated and not changed even when the number of the load program execution processors is increased is obtained, and the minimum number of the processors and the determination result are added to the load test combination program so as to perform tuning; and a load test allocating step in which, in accordance with the tuned load test combination program, the test program and load program having a high load effect are prioritized in allocation to the plurality of processors, so as to execute a long-time load test.

The load test allocating step includes a first load test allocating step in which, if the minimum number of the processors of the tuned load test combination program fully uses all the processors which can execute the load program, or if not all the processors are fully used and there is merely one said test program, the test program is allocated to one of the processors, and the load program is allocated to all the remaining processors, so as to execute a long-time load test; and a second load test allocating step in which, if the minimum number of the processors of the tuned load test combination program does not fully use all the processors which can execute the load program and a plurality of the test programs which belong to the load test combination program of the same configuration are present, the plurality of test programs are allocated to the plurality of processors and the load program is allocated to all the remaining processors, so as to execute a long-time load test.

The second load test execution step of the case in which the connection characteristics of the connection mechanisms have a difference therebetween includes a load test combination determination step in which execution time of a no-load state in which merely the test program is executed by all the processors is compared with execution time of a loaded-state of the test program when the test program is executed by one of the processors and, at the same time, the load program is executed by the remaining plurality of processors while sequentially changing the processors which execute the load program, wherein, if the execution time of the loaded state is longer than the execution time of the no-load state, the load program is determined to have a load effect, and the load test combination program in which the test program and the load program are combined is determined;

a connection characteristics sorting step in which, with respect to the load test combination program, execution time of the test program is measured while changing the processor which executes the load program, and the processors of which execution time is in particular ranges are grouped and sorted into a plurality of processor groups;

a tuning step in which, with respect to the load test combination program, for each of the processor groups, one of the processors is caused to execute the test program, the remaining processors are caused to execute the load program while changing the number of the processors, the minimum number of the processors at which the execution time of the test program is saturated and not changed even when the number of the load program execution processors is increased is obtained, and the minimum number of the processors is added to the load test combination program so as to perform tuning; and a load test allocating step in which, in accordance with the tuned load test combination program, the test program and load program having a high load effect are prioritized in allocation to the plurality of processors, so as to execute a long-time load test.

The load test allocating step is characterized by including a first load test allocating step in which, if the minimum number of the processors of the tuned load test combination program of the processor group in which the test program is present fully uses all the processors which can execute the load program, or if not all the processors are fully used and there is merely one said test program, the test program is allocated to one of the processors of the processor group, and the load program is allocated to all the remaining processors, and, in the remaining processor groups, the load program of the respective tuned load test combination program is allocated to all the processors, so as to execute a long-time load test;

a second load test allocating step in which, if the minimum number of the processors of the tuned load test combination program of the processor group in which the test program is present does not fully use all the processors which can execute the load program and a plurality of the test programs which belong to the load test combination program of the same configuration are present, the plurality of test programs are allocated to the plurality of processors and the load program is allocated to all the remaining processors, and, in the remaining processor group, the load program of the respective tuned load test combination program is allocated to all the processors, so as to execute a long-time load test.

In the connection characteristics sorting step, a minimum integral multiple E of $2^n$ is derived from the numbers of the processors of the plurality of the processor groups which are sorted in accordance with the execution time of the particular ranges, and the number of the processors of each of the processor groups is corrected such that the number is an integral multiple of the integral multiple E.

In the connection characteristics sorting step, if the numbers of the processors of the plurality of processor groups which are sorted in accordance with the execution time of the particular ranges are not integral multiples of the integral multiple E, the numbers of the processors are corrected by moving the processor having execution time close to the adjacent processor group on a time axis.

The load program may include at least two load programs having different load effects so as to enhance the load effect.

The test program is a program which measures the execution time by executing a test command which examines data referencing and data write by the processor; and the load program is a program which executes a load command which exerts influence in terms of hardware operation by outputting operation requests including memory exclusive control, memory interleave control, bus arbitration control, and external input/output control from the processor to the connection mechanism.

As another mode of the present invention, a test method of a data processing system in which a plurality of processors are mutually connected by one or a plurality of connection mechanisms having no difference in connection characteristics in terms of hardware implementation, is characterized by including a load test combination determination step in which execution time of a no-load state in which merely the test program is executed by all the processors is compared with execution time of a loaded state of the test program when the test program is executed by one of the processors and the load program is executed by all the remaining plural processors at the same time, wherein, if the execution time of the loaded state is longer than the execution time of the no-load state, the load program is determined to have a load effect, and a load test combination program in which the test program and the load program are combined is determined;

a tuning step in which, with respect to the load test combination program, one of the processors is caused to execute the test program, the remaining processors are caused to execute the load program while changing the number of the processors, the minimum number of the processors at which the execution time of the test program is saturated and not changed even when the number of the load program execution processors is increased is obtained, and the minimum number of the processors is added to the load test combination program so as to perform tuning; and a load test allocating step in which, in accordance with the tuned load test combination program, the test program and load program having a high load effect are prioritized in allocation to the plurality of processors, so as to execute a long-time load test.

In another mode of the present invention, a test method of a data processing system in which a plurality of processors are mutually connected by a plurality of connection mechanisms having a difference in connection characteristics in terms of hardware implementation, is characterized by including a load test combination determination step in which execution time of a no-load state in which merely the test program is executed by all the processors is compared with execution time of a loaded state of the test program when the test program is executed by one of the processors and the load program is executed by all the remaining plural processors at the same time while sequentially changing the executing processors, wherein, if the execution time of the loaded state is longer than the execution time of the no-load state, the load program is determined to have a load effect, and a load test combination program in which the test program and the load program are combined is determined;

a connection characteristics sorting process in which, with respect to the load test combination program, execution time of the test program is measured while changing the processors which execute the load program, and the processors of which execution time is in particular ranges are grouped and sorted into a plurality of processor groups;

a tuning step in which, with respect to the load test combination program, one of the processors is caused to execute the test program for each processor group, the remaining processors are caused to execute the load program while changing the number of the processors, the minimum number of the processors at which the execution time of the test program is saturated and not changed even when the number of the load program execution processors is increased is obtained, and the minimum number of the processors is added to the load test combination program so as to perform tuning; and a load test allocating step in which, in accordance with the tuned load test combination program, the test program and load program having a high load effect are prioritized in allocation to the plurality of processors, so as to execute a long-time load test.

(Program)

The present invention provides a test program which is executed by a computer which controls a data processing system in which a plurality of processors are mutually connected by one or a plurality of connection mechanisms.

Such test program of the present invention is characterized by causing the computer which controls the data processing system to execute a connection characteristics determination step in which whether the connection mechanisms have a difference in connection characteristics in terms of hardware implementation or not is determined;

a first load test execution step in which, if the connection characteristics of the connection mechanisms have no difference therebetween, a load test combination program in which a test program and a load program having a load effect are combined is determined for all the processors, so as to execute a long-time load test; and a second load test execution step in which, if the connection characteristics of the connection mechanisms have a difference therebetween, a load test combination program in which a test program and a load program having a load effect are combined is determined for each of a plurality of processor groups which are sorted in accordance with the difference of the connection characteristics, so as to execute a long-time load test.

Herein, the first load test execution step includes a load test combination determination step in which execution time of a no-load state in which merely the test program is executed by all the processors is compared with execution time of a loaded state of the test program when the test program is executed by one of the processors and the load program is executed by all the remaining plural processors at the same time, wherein, if the execution time of the loaded state is longer than the execution time of the no-load state, the load program is determined to have a load effect, and a load test combination program in which the test program and the load program are combined is determined;

a tuning step in which, with respect to the load test combination program, one of the processors is caused to execute the test program, the remaining processors are caused to execute the load program while changing the number of the processors, the minimum number of the processors at which the execution time of the test program is saturated and not changed even when the number of the load program execution processors is increased is obtained, and the minimum number of the processors is added to the load test combination program so as to perform tuning; and a load test allocating step in which, in accordance with the tuned load test combination program, the test program and load program having a high load effect are prioritized in allocation to the plurality of processors, so as to execute a long-time load test.

The second load test execution step includes a load test combination determination step in which execution time of a no-load state in which merely the test program is executed by all the processors is compared with execution time of a loaded-state of the test program when the test program is executed by one of the processors and, at the same time, the load program is executed by the remaining plurality of processors while sequentially changing the processors which execute the load program, wherein, if the execution time of the loaded state is longer than the execution time of the no-load state, the load program is determined to have a load effect, and the load test combination program in which the test program and the load program are combined is determined;

a connection characteristics sorting step in which, with respect to the load test combination program, execution time of the test program is measured while changing the processor which executes the load program, and the processors of which execution time is in particular ranges are grouped and sorted into a plurality of processor groups;

a tuning step in which, with respect to the load test combination program, for each of the processor groups, one of the processors is caused to execute the test program, the remaining processors are caused to execute the load program while changing the number of the processors, the minimum number of the processors at which the execution time of the test program is saturated and not changed even when the number of the load program execution processors is increased is obtained, and the minimum number of the processors is added to the load test combination program so as to perform tuning; and a load test allocating step in which, in accordance with the tuned load test combination program, the test program and load program having a high load effect are prioritized in allocation to the plurality of processors, so as to execute a long-time load test.

(Device)

The present invention provides a test device of a data processing system in which a plurality of processors are mutually connected by one or a plurality of connection mechanisms. For the test device, the present invention has a connection characteristics determination unit in which whether the connection mechanisms have a difference in connection characteristics in terms of hardware implementation or not is determined;

a first load test execution unit in which, if the connection characteristics of the connection mechanisms have no difference therebetween, a load test combination program in which a test program and a load program having a load effect are combined is determined for all the processors, so as to execute a long-time load test; and a second load test execution unit in which, if the connection characteristics of the connection mechanisms have a difference therebetween, a load test combination program in which a test program and a load program having a load effect are combined is determined for each of a plurality of processor groups which are sorted in accordance with the difference of the connection characteristics, so as to execute a long-time load test.

According to the present invention, with respect to a plurality of test programs and load programs prepared in advance, the execution time of a no-load state in which merely the test program is executed by all the processors is compared with the execution time of the test program which is executed by the processors when the test programs and the load programs are combined, and, if it is longer, the combination is determined to have a load effect and determined as a load test combination program; therefore, the combinations of the test programs and the load programs having no or low load effects can be eliminated, and an optimal combination for the load test can be determined.

The functions of the connection mechanisms are designed in a hardware specification level which is different from the logical specification serving as the design level of the load programs. Therefore, the load test combination program of which load effect is determined is executed while changing the number of the processors which execute the load program, and the minimum number of the processors which execute the load program at which the execution time of the test program is saturated is obtained and added to the load test combination program so as to perform tuning. Consequently, the processor allocation of the test program and the load program can be optimized such that high load can be achieved when a long-time load test is to be executed.

When it is unknown that the connection mechanisms do not have differences in the connection characteristics in terms of hardware implementation, with respect to the load test combination program of which load effect is determined, the execution time of the test program is obtained while changing the processors which execute the load program, the processors having close connection characteristics according to execution time are grouped and sorted into processor groups, and tuning of the load test combination program and allocation of the test program and the load program for a long-time load test is performed for each of the processor groups. Consequently, a high-load long-time load test can be efficiently executed for the data processing system having a difference in the connection characteristics of the connection mechanisms in terms of hardware implementation, reliability of the operation examination of the connection mechanisms is improved, and human-related burden can be reduced. The above and other objects, features, and advantages of the present invention will become more apparent from the following detailed description with reference to the drawings.

BRIEF DESCRIPTION OF THE DRAWINGS

FIG. 2 is an explanatory diagram of a data processing system in which connection characteristics of connection mechanisms apparently have no difference;

FIG. 3 is an explanatory diagram of another data processing system in which connection characteristic of connection mechanism apparently has no difference;

FIGS. 4A and 4B are explanatory diagrams of a data processing system in which connection characteristics of connection mechanisms have differences;

FIGS. 7A and 7B are explanatory diagrams of a process of determining combinations of a test program and a load program in the case in which there is no difference in the connection characteristics;

FIG. 8 is an explanatory diagram of a measurement result list of combination processes of test programs and load programs;

FIGS. 12A and 12B are explanatory diagrams of program allocating processes upon load test execution when the minimum number of processors obtained in the tuning process of the case in which there is no difference in connection characteristics does not fully use all the processors for load allocation;

FIG. 14 is an explanatory diagram of a measurement result list of the execution time of the test program;

FIGS. 15A to 15E are explanatory diagrams of a process of determining combination of test programs and load programs in the case in which there is no difference in connection characteristics;

FIG. 16 is an explanatory diagram of a measurement result list of combination processes of the test program and the load program according to FIGS. 15A to 15E;

FIGS. 21A to 21D are explanatory diagrams of another tuning process of load test combination programs performed for each processor group in the case in which there is difference in connection characteristics;

DETAILED DESCRIPTION OF THE PREFERRED EMBODIMENTS

Figure 1A:
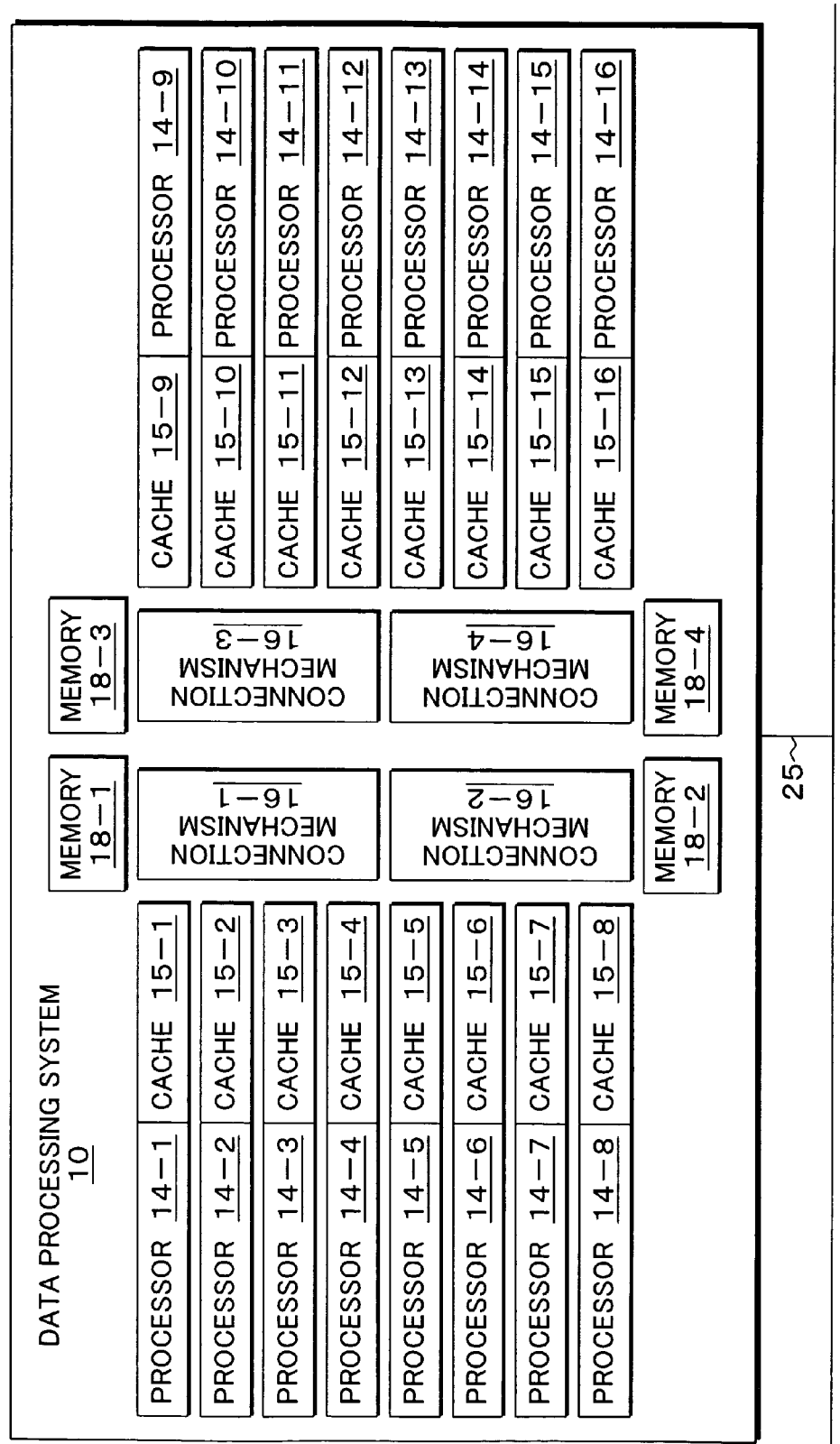
FIGS. 1A and 1B are block diagrams of a functional configuration showing an embodiment of a data processing system test method according to the present invention.
Figure 1B:
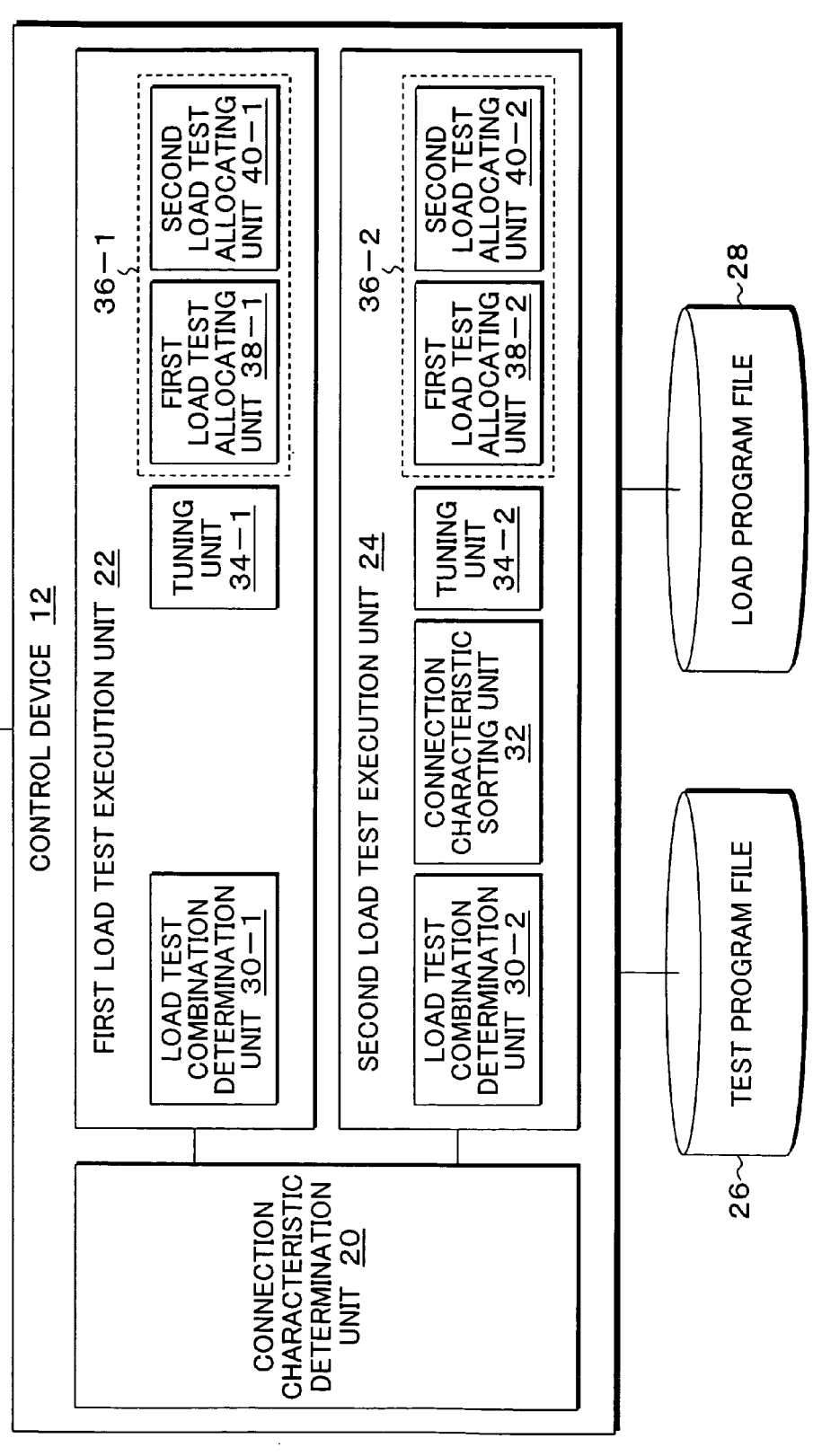

FIGS. 1A and 1B are block diagrams of a functional configuration showing an embodiment of a data processing system to which a load test of the present invention is applied. In FIGS. 1A and 1B, a control device 12 of the present embodiment which executes the load test for the data processing system 10 which serves as an object of the load test is provided, and the load test of the data processing system 10 is performed by processing functions of the control device 12. The data processing system 10 is provided with, when viewed from the control device 12 which performs control management of the load test, for example, 16 processors 14-1 to 14-16, cache devices 15-1 to 15-16 loaded on the processors 14-1 to 14-16, memories 18-1 to 18-4 which function as shared devices, and connection mechanisms 16-1 to 16-4 mutually connecting the processors 14-1 to 14-16 and the memories 18-1 to 18-4. In the control device 12, a connection characteristics determination unit 20, a first load test execution unit 22, and a second load test execution unit 24 are provided. In addition, a test program file 26 and a load program file 28 are provided for the control device 12. For example, test programs 26-1, 26-2, and 26-3 are stored in the test program file 26 in advance, and, for example, load programs 28-1, 28-2, and 28-3 are stored in the load program file 28. The number of the test programs and the load programs which are prepared in advance is arbitrary. Each of the test programs 26-1 to 26-3 is a program which confirms validity in referencing and writing of data from a processor to a memory and referencing and writing to a cache device in another processor. Each of the load programs 28-1 to 28-3 is a program which is executed by a processor in the state in which a test program is executed by another processor and causes it to operate in order to output operation requests, which are more than the simultaneous processing capability, to connection mechanisms. More specifically, in the load test of the data processing system 10, in the state in which the test program is executed by a certain processor, the load program is executed by another processor, and operation requests from the processor which are more than the simultaneous processing capability that the connection mechanisms have are output, thereby temporarily generating an execution waiting state in the processor which is executing the test program and generating a loaded state in which they are sequentially processed. When the load test in which a certain processor is caused to execute the test program and another processor is caused to execute the load program in the above described manner in the data processing system 10 under the instructions of the control device 12, the operation of the connection mechanisms provided in the data processing system 10 can be examined. The test programs and the load programs executed by the processors 14-1 to 14-16 in the load test are downloaded from the control device 12 to all the processors prior to the load test, and, in the load test, the control device 12 gives an instruction to each of the processors that which test program or load program is to be executed. The data processing system 10 herein serving as a test object of the control device 12 forms a symmetric multiprocessor system which is connected so as to perform equivalent access, in terms of logical specification, to the memories 18-1 to 18-4 shared among the processors 14-1 to 14-16 and the respective cache devices 15-1 to 15-16. However, in terms of hardware implementation, the connection mechanisms 16-1 to 16-4 of the data processing system 10 are equivalently connected to all the processors in some cases and are not equivalently connected thereto in some cases. More specifically, the connection mechanisms 16-1 to 16-4 can be classified into two cases, the case in which there is no difference in connection characteristics with respect to the processors 14-1 to 14-16 and the case in which there is difference in the connection characteristics. In the load test by means of the control device 12 of the present embodiment, they are classified into the case in which there is no difference in the connection characteristics of the connection mechanisms and the case in which there is difference in the connection characteristics to execute a test process. Therefore, a connection characteristics determination unit 20 is provided in the control device 12 and determines whether it is apparent that the connection mechanisms 16-1 to 16-4 of the data processing system 10 serving as a test object has no difference in the connection characteristics in terms of hardware implementation or has difference (including the cases in which presence of difference is unknown) When it is apparent that the connection characteristics of the connection mechanisms have no difference, the first load test execution unit 22 determines a load test combination program in which the test programs and the load programs having load effects are combined for all the processors 14-1 to 14-16, allocates the test programs to part of the processors 14-1 to 14-16, allocates the load programs to the rest, and executes a long-time load test. On the other hand, when the connection characteristics of the connection mechanisms have difference (including the cases in which presence of the difference is unknown), the second load test execution unit 24 sorts them into a plurality of processor groups in accordance with the difference in the connection characteristics obtained through measurement of the load effects which depend on the combinations of the test programs and the load programs, determines a load test combination program in which the test programs and the load programs having load effects are combined for each of the processor groups, allocates the determined test program and the load program to each of the processor groups, and executes a long-time load test. In the first load test execution unit 22 which executes the load test in the case in which the connection characteristics have no difference therebetween as described above, as processing functions thereof, a load test combination determination unit 30-1, a tuning unit 34-1, and a load test allocating unit 36-1 are provided; and, furthermore, the load test allocating unit 36-1 is composed of a first load test allocating unit 38-1 and a second load test allocating unit 40-1. In the second load test execution unit 24 which performs the load test in the case in which the connection characteristics of the connection mechanisms have difference therebetween, a load test combination determination unit 30-2, a connection characteristics sorting unit 32, a tuning unit 34-2, and a load test allocating unit 36-2 are provided; and, furthermore, the load test allocating unit 36-2 is composed of a first load test allocating unit 38-2 and a second load test allocating unit 40-2. Specific examples of the case in which the connection characteristics of the connection functions in the data processing system 10 have no difference therebetween and the case in which the connection characteristics of the connection functions have difference will be described below.

FIG. 2 shows, together with the control device 12, a data processing system 10-1 of the case in which the connection mechanisms have no difference therebetween in the connection characteristics in terms of hardware implementation. The data processing system 10-1 has eight processors 14-1 to 14-8, which respectively have dedicated cache devices 15-1 to 15-8 and connection mechanisms 62-1 to 62-8, and they are connected to memories 18-1 and 18-2 serving as shared devices via the connection mechanisms 62-1 to 62-8. Such data processing system 10-1 forms a symmetric multiprocessor system which equivalently accesses, in terms of logical specifications, the memories 18-1 and 18-2 shared by the processors 14-1 to 14-8 and the cache devices 15-1 to 15-8. At the same time, all the processors are equivalently connected also in terms of hardware implementation since the processors 14-1 to 14-8 respectively have the individual connection mechanisms 62-1 to 62-8. Therefore, it is apparent that the connection characteristics of the connection mechanisms do not have difference therebetween.

FIG. 3 shows, together with the control device 12, a data processing system 10-2 as another embodiment in which it is apparent that the connection characteristics in terms of hardware implementation have no difference. In the data processing system 10-2, eight processors 14-1 to 14-8 are respectively provided with cache devices 15-1 to 15-8 and connected to a shared connection mechanism 16. Therefore, a symmetric multiprocessor system which equivalently accesses, in terms of logical specifications, the memories 18-1 and 18-2 shared among the processors 14-1 to 14-8 and the cache devices 15-1 to 15-8 is formed. At the same time, also in terms of hardware implementation, all the processors 14-1 to 14-8 are equivalently connected by the connection by means of the single connection mechanism 16, and it is apparent that the connection characteristic of the connection mechanism 16 has no difference.

Figure 4A:
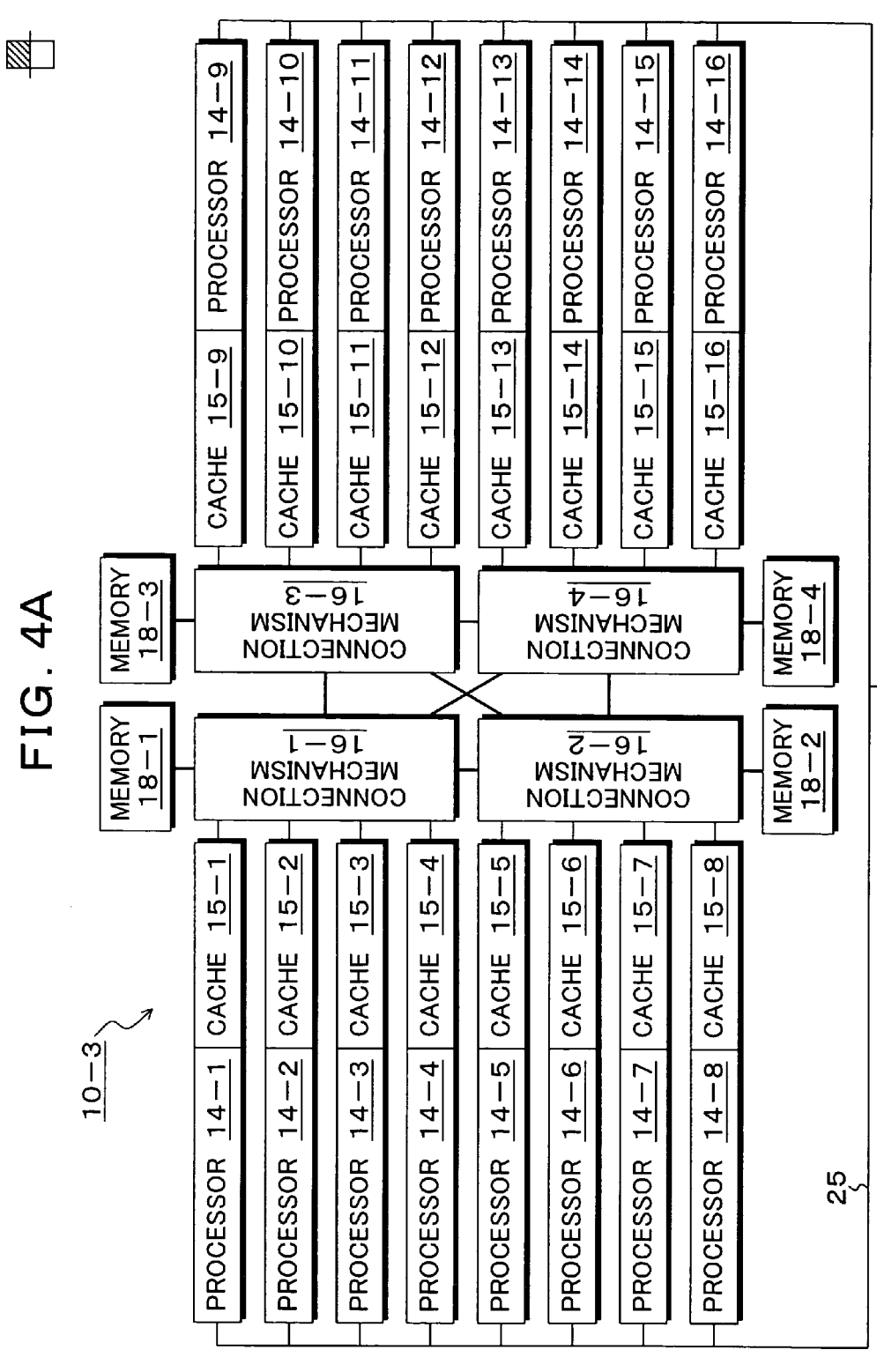

FIGS. 4A and 4B show, together with the control device 12, a data processing system 10-3 serving as an embodiment in which the connection characteristics have difference therebetween. The data processing system 10-3 has sixteen processors 14-1 to 14-16, also sixteen cache devices 15-1 to 15-16 respectively provided therein, and four memories 18-1 to 18-4 as shared devices. Connection between the processors 14-1 to 14-16 and the memories 18-1 to 18-4 is established via four connection mechanisms 16-1 to 16-4. The connection by means of the connection mechanisms 16-1 to 16-4 connects the processors 14-1 to 14-4 to the connection mechanism 16-1, connects the processors 14-5 to 14-8 to the connection mechanisms 16-2, connects the processors 14-9 to 14-12 to the connection mechanism 16-3, and, furthermore, connects the processors 14-13 to 14-16 to the connection mechanism 16-4; and, in this state, the connection individually connects the memories 18-1 to 18-4 to the four connection mechanisms 16-1 to 16-4, respectively, and, furthermore, mutually connects the four connection mechanisms 16-1 to 16-4. The data processing system 10-3 forms a symmetric multiprocessor system, which performs equivalent access in terms of logical specifications, for the memories 18-1 to 18-4 shared among the processors 14-1 to 14-16 and the respective cache devices 15-1 to 15-16; however, not all the processors are equivalently connected in terms of hardware implementation, and the processors 14-1 to 14-16 respectively have differences in the connection characteristics by means of the connection mechanisms 16-1 to 16-4. For example, when the processor 14-1 accesses the memory 18-1, the access is made merely via the connection mechanism 16-1; however, when access is made to the memory 18-4, the access has to be made, for example, via the connection mechanisms 16-1 and 16-4, and it is apparent that the connection characteristics have differences in terms of hardware implementation.

Figure 5:
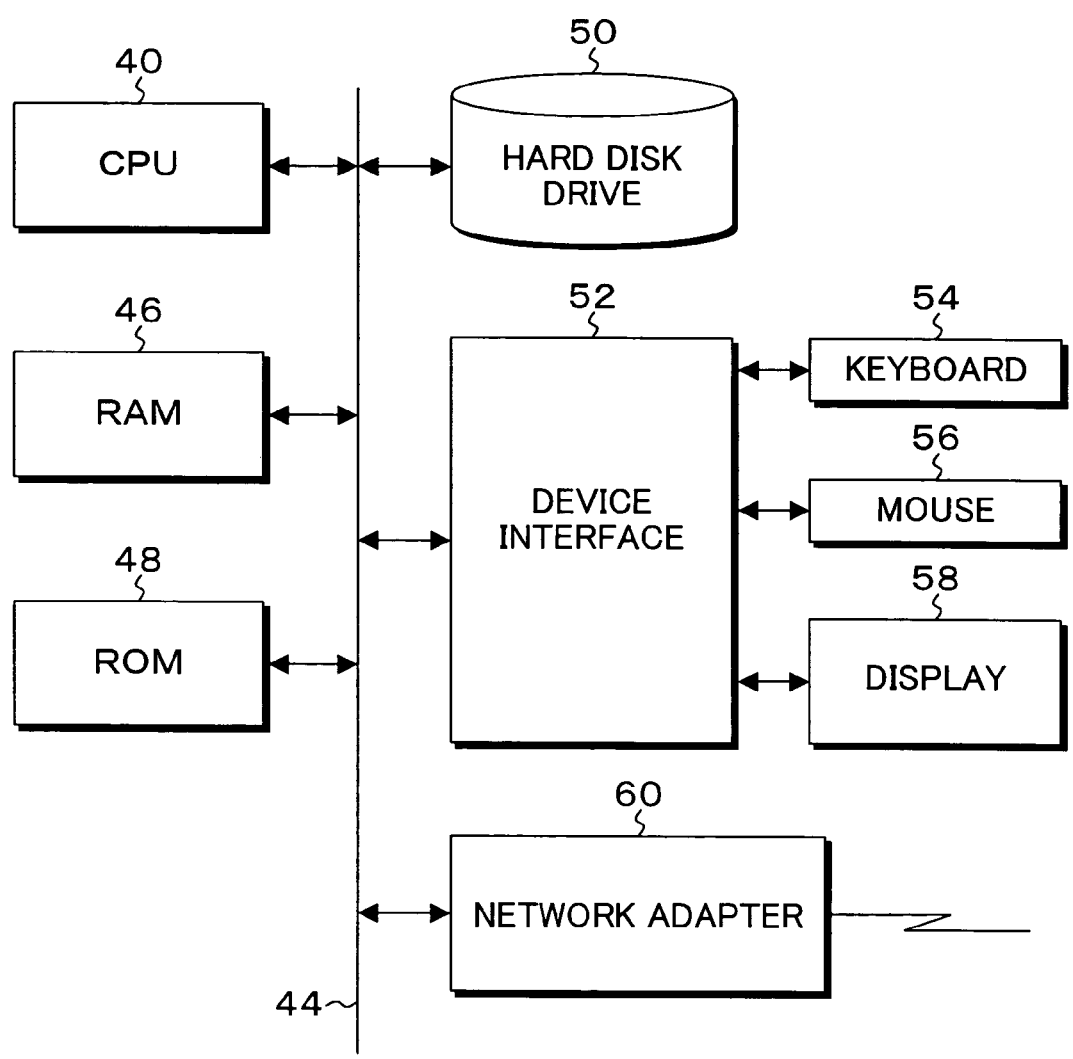
FIG. 5 is a block diagram of a hardware environment of a computer which executes a test program of the present embodiment.

FIG. 5 is a block diagram of a hardware environment of a computer which executes test programs which realize the functions of the connection characteristics determination unit 20, the first load test execution unit 22, and the second load test execution unit 24 of the control device 12 of FIGS. 1A and 1B. In FIG. 5, to a bus 44 of a CPU 40, a RAM 46, a ROM 48, a hard disk drive 50, a device interface 52 connecting a keyboard 54, a mouse 56, a display 58, and a network adapter 60 which connects a network path 25 to the data processing system 10. The test programs of the present embodiment are stored in the hard disk drive 50. When the computer is activated, the test programs are read from the hard disk drive 50 to the RAM 46 after activating an OS by the boot-up and executed by the CPU 40.

Figure 6:
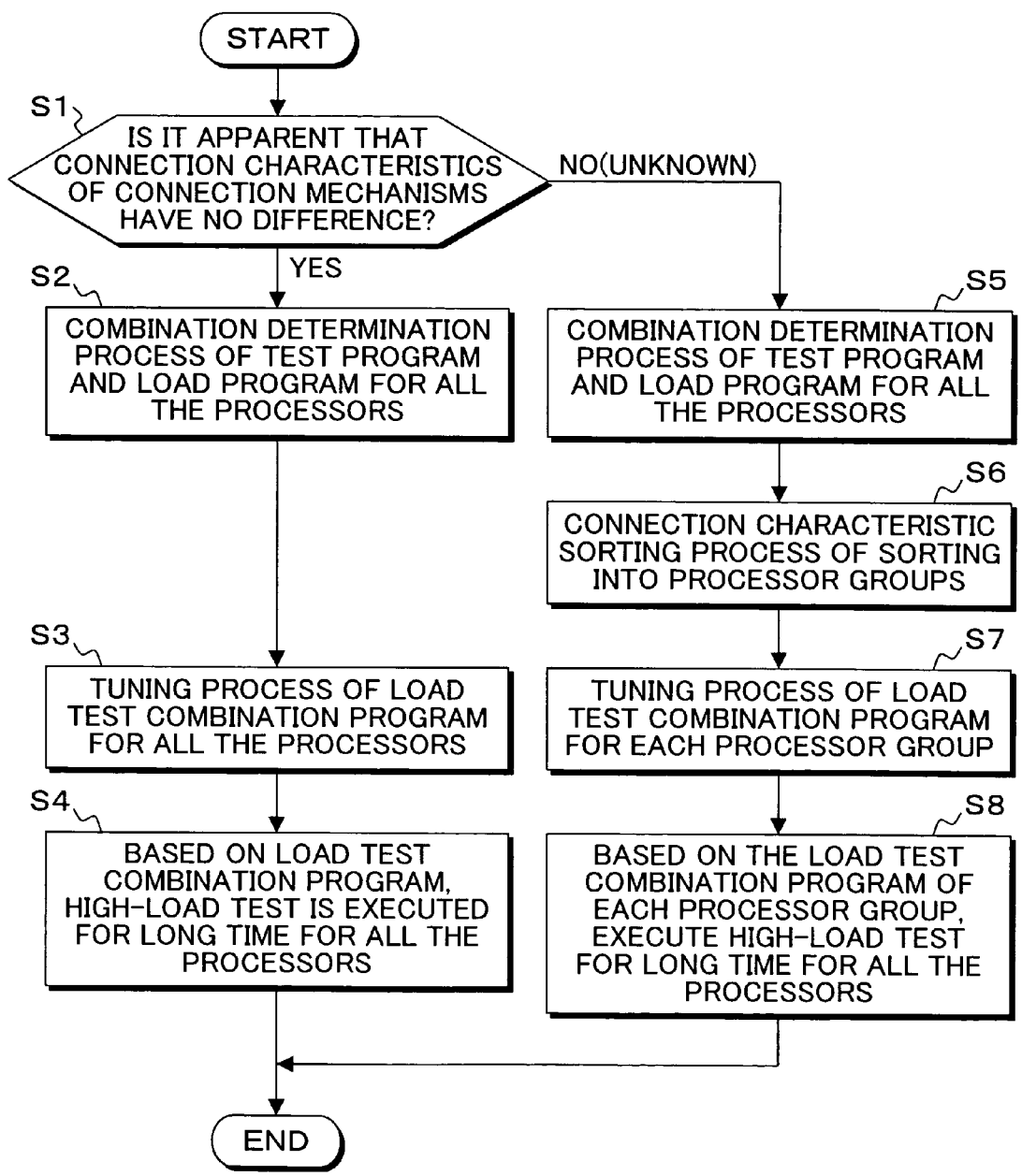
FIG. 6 is a flow chart showing a processing procedure according to a test method of the present embodiment.

FIG. 6 is a flow chart showing a processing procedure of the test programs which realizes the load test of the present embodiment. The process of FIG. 6 will be described below in accordance with the functional configuration of the control device 12 shown in FIGS. 1A and 1B. In the control device 12, when the load test for the data processing system 10 is activated, first of all, in step S1, the connection characteristics determination unit 20 determines whether it is apparent or not that the data processing system 10 serving as the test object has no difference in the connection characteristics of the connection mechanisms. In this case, when the data processing system serving as the test object is like the data processing system 10-1 of FIG. 2 or the data processing system 10-2 of FIG. 3, it is apparent that the connection characteristics of the connection mechanisms have no difference therebetween; therefore, the processes of steps S2 to S4 are performed. The process of step S2 is executed by the load test combination determination unit 30-1 of the first load test execution unit 22, the process of step S3 is executed by the tuning unit 34-1, and the process of step S4 is executed by the load test allocating unit 36-1. Meanwhile, if it is unknown that whether the connection characteristics of the connection mechanisms have difference therebetween or not, that is, for example a case like the data processing system 10-3 of FIGS. 4A and 4B, the processes of steps S5 to S8 are executed. The processes of steps S5 to S8 correspond to the second load test execution unit 24 of the control device 12 shown in FIGS. 1A and 1B. The process of step S5 is executed by the load test combination determination unit 30-2, the process of step S6 is executed by the connection characteristics sorting unit 32, the process of step S7 is executed by the tuning unit 34-2, and the process of step S8 is executed by the load test allocating unit 36-2. Therefore, the load test process by means of the control device 12 according to the present embodiment will be according to detail separately in the process by the first load test execution unit 22 in the case in which the connection characteristics of the connection mechanisms have no difference and the case by the second load test execution unit 24 in which the connection characteristics of the connection mechanisms have difference. The load test combination determination unit 30-1 of the first load test execution unit 22 executes a combination determination process for, for example, the data processing system 10-1 of FIG. 2 in which it is apparent that the connection characteristics of the connection mechanisms have no difference through measurement of load effects of the test programs and load programs. More specifically, when the combination of the test program 26-1 and the load program 28-1 is taken as an example, first of all, the load test combination determination unit 30-1 executes the test programs 26-1 in the state in which the test programs are attached to all the processors 14-1 to 14-8, and measures execution time T1 in a no-load state. The execution time T1 is obtained as a difference between the start time and the end time of the test programs.

FIG. 7A is an explanatory diagram of a measurement process of the execution time in execution of the test programs performed by the processors 14-1 to 14-8, wherein the same test programs 26-1 are allocated to and executed by all the processors 14-1 to 14-8 so as to obtain the execution time T1 of the test program. Herein, eight periods of the test time can be measured for the eight processors 14-1 to 14-8; however, any one of the processors, for example, the processor 14-1 may be used as a representative to obtain the measurement time T1, or the execution time T1 may be obtained from the mean value of all of the measurement time periods. Then, as shown in FIG. 7B, the same test programs 26-1 are allocated to the processors 14-1 to 14-7, at the same time the load program 28-1 is allocated to the processor 14-8, and they are executed at the same time, thereby measuring execution time T11 of the test programs in the loaded state in which the test programs 26-1 and the load program 28-1 are combined. Then, when the execution time T11 of the loaded state is longer than the execution time T1 of the no-load state, it is determined that the load program 28-1 has a load effect, and a load test combination program in which the test program 26-1 and the load program 28-1 are combined is determined.

FIG. 8 shows a list of measurement results obtained by performing measurement tests of load effects by the load test combination determination unit 30-1 for all the combinations of the three test programs 26-1 to 26-3 and the load programs 28-1 to 28-3 provided in the test program file 26 and the load program file 28 of FIGS. 1A and 1B. In the list of the measurement results, T1, T2, and T3 are obtained for the test programs 26-1 to 26-3 as independent execution time, i.e., execution time of the no-load state. Also, T11 to T33 are obtained as combination execution time of the loaded states in which each of the load programs 28-1 to 28-3 is combined with the test programs 26-1 to 26-3. When such list of measurement results is obtained, the independent execution time of the test programs and the execution time of the combinations with the load programs are compared with each other. If the combination execution time is longer, the combination is determined to have a load effect and is determined as an effective combination. In the list of the measurement results, although the combination of the test program 26-1 and the load program 28-2 is excluded since the combination execution time T12 is shorter than the independent execution time T1, except for that, all of them are determined as effective combinations having load effects. In addition, priorities 1 to 8 are set for the combinations of the test programs and the load programs in the descending order of the combination execution time. As a result of setting the priorities indicating the degrees of load effects in the above described manner for the combinations of the test programs and load programs having load effects, when the long-time load test is to be performed by actually allocating the test programs and load programs to the processors, the load test of high load can be performed by selecting the combinations of the test programs and the load programs in the descending order of load effects, i.e., the descending order of priorities. Next, the tuning process in step S3 of FIG. 6 by the tuning unit 34-1 of FIGS. 1A and 1B will be according to the tuning process, when, for example, the combination of the test program 26-1 and the load program 28-1 is taken as an example for the load test combination program determined in step S2 and for the eight processors 14-1 to 14-8 in the data processing system 10-1 of FIG. 2 serving as a test object, one of the processors is caused to execute the test program 26-1, the other seven processors are caused to execute the load program while changing the number of the processors that execute the load program 28-1, the minimum number of the processors with which the execution time of the test program 26-1 is not changed but saturated even when the number of the processors that execute the load program is increased is obtained, and the minimum number of the processors is added to the already-determined load test combination program so as to perform tuning. In this tuning of the load test combination program, optimal numbers of the test programs and the load programs allocated to the processors are determined while testing the load effects, since, merely by determining the combination of the test program and the load program having a load effect, it is unknown that how the test programs and the load programs should be allocated in order to realize a high-load test in the plurality of processors which are to be subjected to the load test.

Figure 9A:
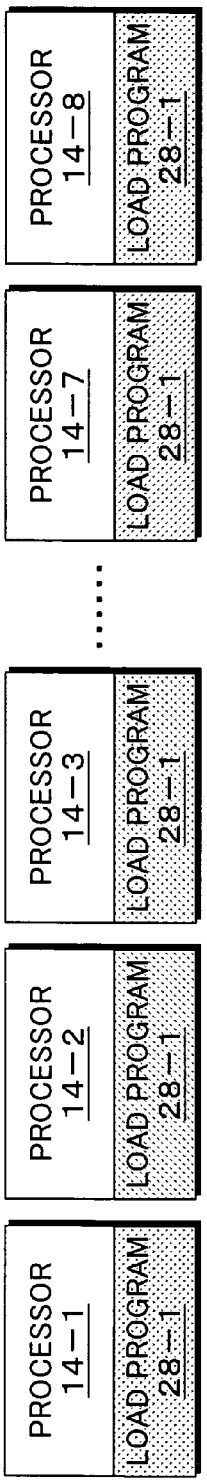
FIGS. 9A to 9D are explanatory diagrams of a tuning process of load test combination programs of the case in which there is no difference in connection characteristics.
Figure 9B:
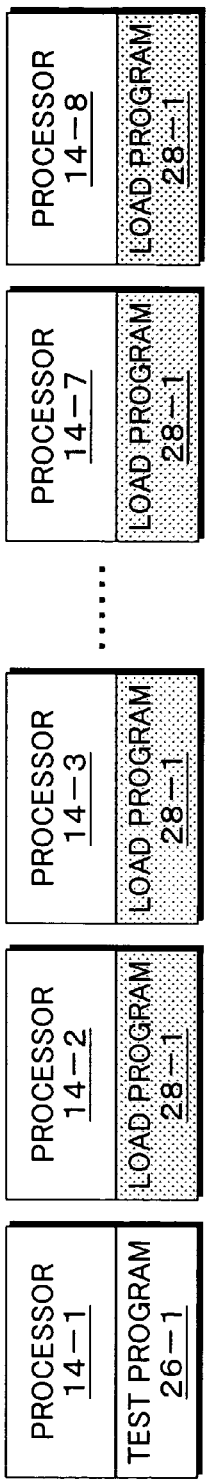
Figure 9C:
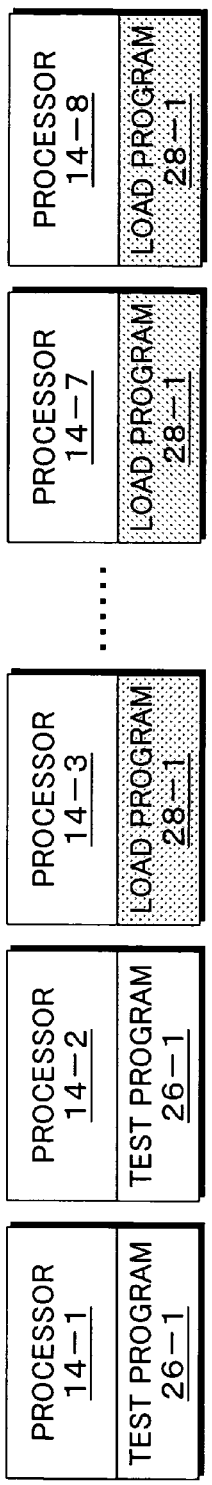
Figure 9D:
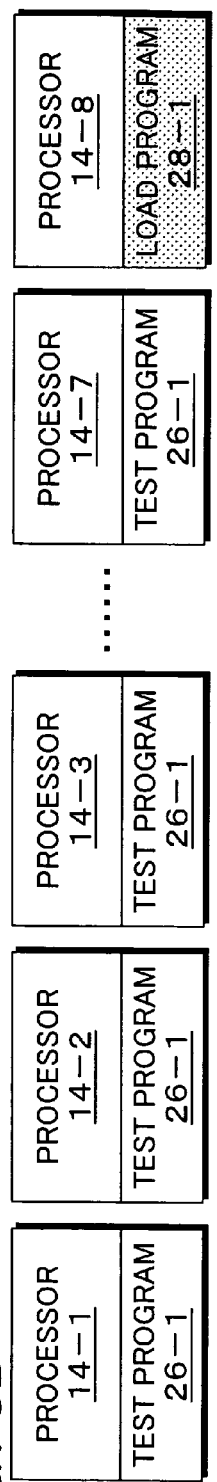

FIGS. 9A to 9D are explanatory diagrams of the tuning process of combinations of the load program 28-1 and the test program. In this process, instead of sequentially increasing the number of the processors which execute the load program, the load program is allocated to all the processors at the beginning, and the number of the processors which execute the test program is sequentially increased from this state, thereby achieving efficiency of the process. More specifically, as shown in FIG. 9A, in the tuning process, first of all, the load program 28-1 is allocated to all the eight processors 14-1 to 14-8; and then, as shown in FIG. 9B, in the state in which the test program 26-1 is allocated to one processor, for example, the processor 14-1, the test program and the load program are executed by the processors 14-1 to 14-8, and the execution time of the test program 26-1 is measured. Hereinafter, as shown in FIGS. 9C and 9D, the number of the processors which execute the test program 26-1 is sequentially increased, and the execution time of the test program is respectively obtained.

Figure 10A:
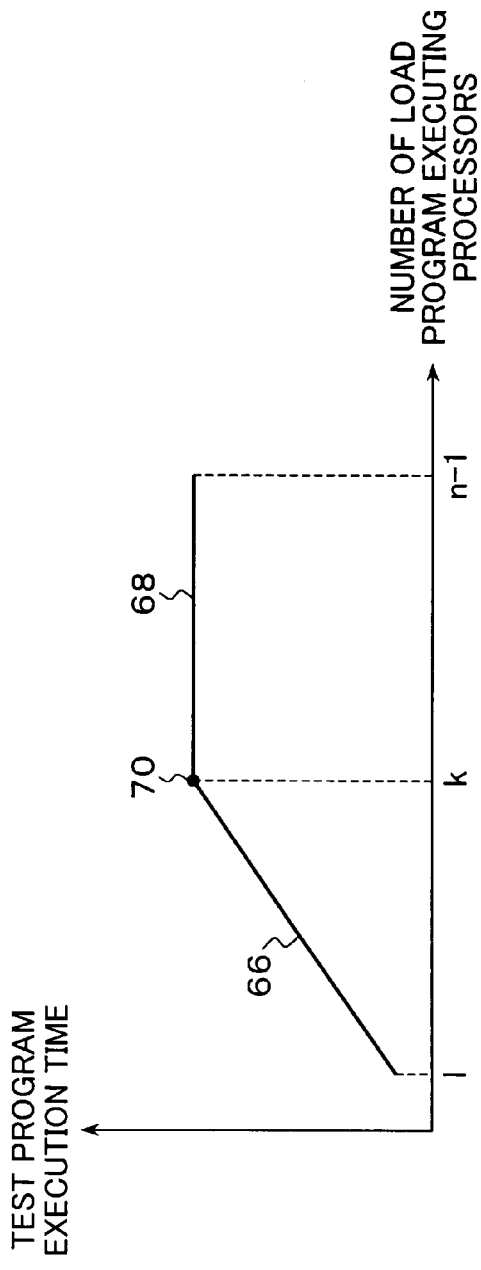
FIGS. 10A and 10B are explanatory diagrams of the relation between the number of load program executing processors and the execution time of test program in tuning processes.
Figure 10B:
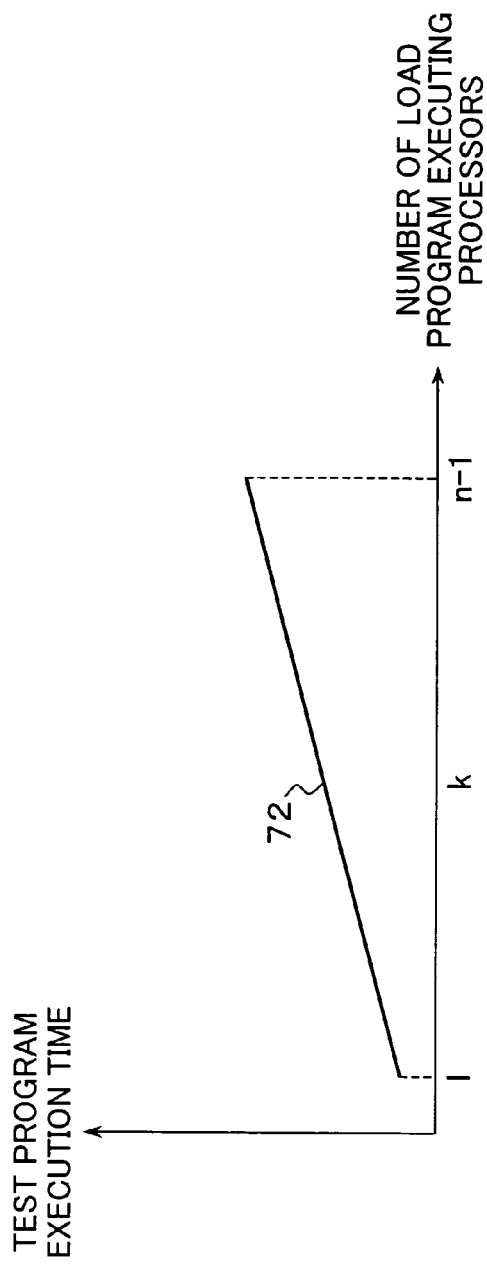

FIGS. 10A and 10B show measurement results according to the tuning process of FIGS. 9A to 9D. In FIG. 10A, the horizontal axis represents the number of processors which execute the load program, and the vertical axis represents the test program execution time. When the number of processors serving as test objects is n, the maximum number of the processors which execute the load programs is (n−1) which is smaller than the number by one. In the case of FIGS. 9A to 9D, since n=8, it is (n−1)=7. When, for example as shown in FIGS. 9A to 9D, the load program is allocated to all the processors which execute the load program, and subsequently, the execution time is obtained while sequentially increasing the processors which execute the test program and decreasing the processors which execute the load program; in FIG. 10A, in the state in which the number of the load program execution processors is large, the execution time is constant and in a saturated state in the manner of a straight line 68, however, from the point when the number of the load allocated processors decreases to k, the execution time begins to decrease as shown by a straight line 66. Above described k which is the number of the processors at this point provides a saturation point 70 from which the execution time of the test program does not changes even if the number of the processors which execute the load program is further increased. Therefore, in the tuning process of this case, the load program execution processor number k which provides the saturation point 70 is added to the combination of the test program 26-1 and the load program 28-1 as a tuning parameter. Such tuning is executed for the combinations of the test programs and load programs which are shown in the list of FIG. 8 and have load effects, and load test combination program information having the format of tuned test combination program =(test program, load program, minimum number of processors of load saturation) is generated. FIG. 10B is the case in which the number of the processors which execute the load program is sequentially decreased and the case in which no saturation point is generated in the middle as shown by a straight line 72. More specifically, the case of FIG. 10B is the case in which the load saturation, from which the execution time of the test program does not further increases, cannot be obtained even when all the (n−1) processors which execute the load program are fully used. As the minimum number of the processors of load saturation added as the tuning parameter in this case, the number of all the processors that execute the load program (n−1) is added. In the case like FIG. 10A in which the processors for load allocation are not fully used in execution of the load program and in the case like FIG. 10B in which they are fully used, allocation of the test program and the load program to the processors which achieves the maximum load is performed for the test program and the load program specified by the tuned load test combination program and program allocation in the long-time load test based on the minimum number of processors under respective conditions. Next, the processes of the load test allocating unit 36-1 of FIGS. 1A and 1B which executes a high-load test for a long time for all the processors based on the tuned load test combination program of step S3 of FIG. 6 will be according to the processes of the load test allocating unit 36-1, in accordance with the tuned load test combination program, a test program and a load program having high load effects are prioritized in allocation to the plurality of processors, thereby executing the long-time load test. The processes of the load test allocating unit 36-1 are separated into a process by the first load test allocating unit 38-1 and a process by the second load test allocating unit 40-1.

Figure 11A:
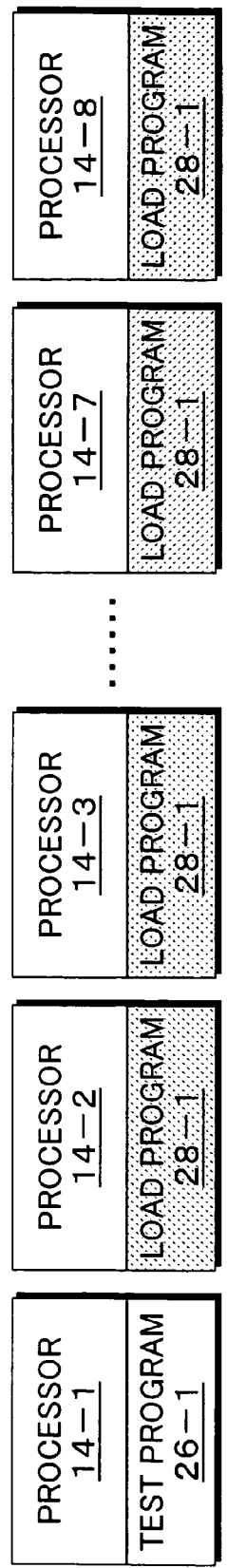
FIGS. 11A and 11B are explanatory diagrams of program allocating processes upon load test execution in the case in which the minimum number of processors obtained in the tuning process of the case in which there is no difference in connection characteristics fully uses all the processors for load allocation.
Figure 11B:
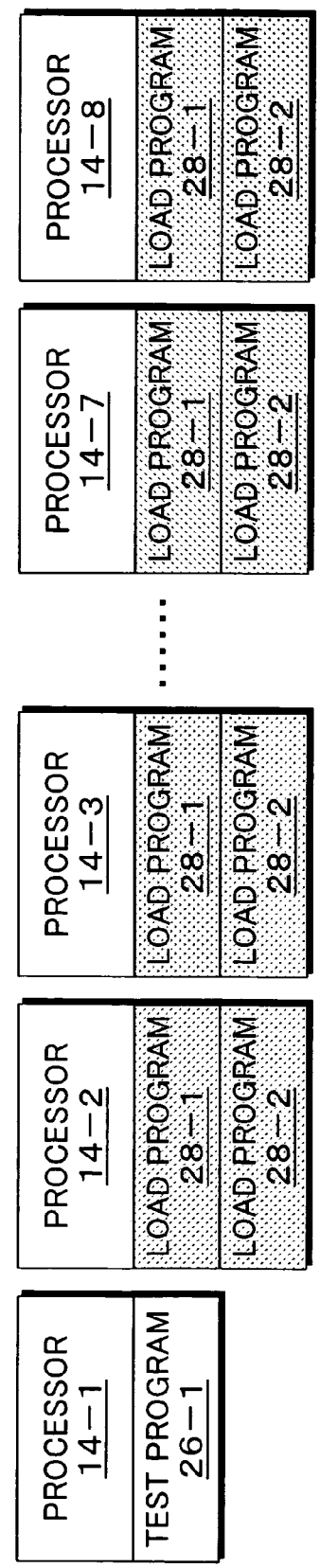

FIGS. 11A and 11B show the process by the first load test allocating unit 38-1, in which, if either one of the conditions of (1) the case in which the minimum number of the processors of the tuned load test combination program fully uses all the (n−1) processors which can execute the load program and (2) the case in which all the processors are not fully used and there is merely one test program is satisfied, as shown in FIG. 11A, the test program 26-1 is allocated to one processor 14-1, the load program 28-1 is allocated to all the remaining processors 14-2 to 14-8, and the long-time load test is executed. FIG. 11B is under the same conditions as FIG. 11A; however, it is the case in which the two load programs 28-1 and 28-2 are executed at the same time as the load program so as to enhance the load effects. Also in this case, the test program 26-1 is allocated to one processor 14-1, and the load programs 28-1 and 28-2 are allocated to all the remaining processors 14-2 to 14-8, and they are caused to execute the long-time load test. On the other hand, when two conditions that (1) the minimum number of the processors of the tuned load test combination program does not fully use all the (n−1) processors which can execute the load program, and (2) a plurality of test programs which belong to the load test combination program of the same configuration are present are satisfied, as shown in FIG. 12A, the first load test allocating unit 38-1, for example, allocates the two test programs 26-1 and 26-2 to the processors 14-1 and 14-2 and allocates the load program 28-1 to all the remaining processors 14-3 to 14-8, and causes them to execute the long-time load test.

FIG. 12B is the case in which two load programs 28-1 and 28-2 are used as load programs in order to further enhance load effects; wherein, as well as the conditions of FIG. 12A, the test programs 26-1 and 26-2 are allocated to the processors 14-1 and 14-2, the load program 28-1 and 28-2 are allocated to each of all the remaining processors 14-3 to 14-8, and the long-time load test is executed. When allocation of FIGS. 11A and 11B are possible, the load test allocating unit 36-1 of the present embodiment gives priority to selection of the allocation of FIG. 11B which has a high load effect and causes the long-time load test to be executed, since the test program and load programs having high load effects are prioritized and allocated to the plurality of processors to execute the long-time load test. FIGS. 12A and 12B employed, as examples, the cases in which two test programs which belong to the load test combination program of the same configuration are present; however, when there are more than that, processors corresponding to the number of the test programs are allocated to execution of the respective programs. Next, the data processing system 10-3 of FIGS. 4A and 4B having differences in the connection characteristics of the connection mechanisms is taken as an example to describe the processing function of the second load test execution unit 24 which executes the processes of steps S5 to S8 of FIG. 6 and is provided in the control device 12 of FIGS. 1A and 1B. The load test combination determination unit 30-2 of the second load test execution unit 24 executes a process of determining combinations having load effects among the test programs 26-1 to 26-3 of the test program file 26 and the load programs 28-1 to 28-3 of the load program file 28. In the combination determination process, first of all, as shown in FIG. 13, the test programs 26-1 are executed at the same time in the state in which, for example, the test programs are allocated to all the sixteen processors 14-1 to 14-16 in the data processing system 10-3 of FIGS. 4A and 4B, and the execution time of the test programs 26-1 in a loaded state is measured.

Figure 13:
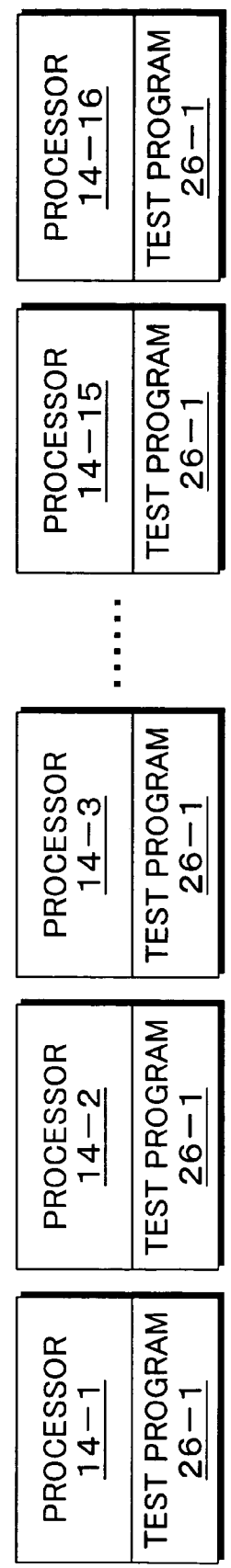
FIG. 13 is an explanatory diagram of a process of measuring the test program execution time in the case in which there is difference in connection characteristics.

FIG. 14 shows a list of the measurement results of the independent execution time obtained by executing merely the test program of FIG. 13. In the list of the measurement results, independent execution time T1 to T16 measured by executing the test program 26-1 by each of the processors 14-1 to 14-16 is stored. Next, the process in which the processor which executes the load program is sequentially changed one by one while all the remaining processors execute the test program is repeated for all the sixteen processors 14-1 to 14-16, and the execution time of the test program of each of them is measured. More specifically, the load program and the test program are allocated thereto and executed in the manner shown in FIGS. 15A to 15E.

Figures 15D, 15E:
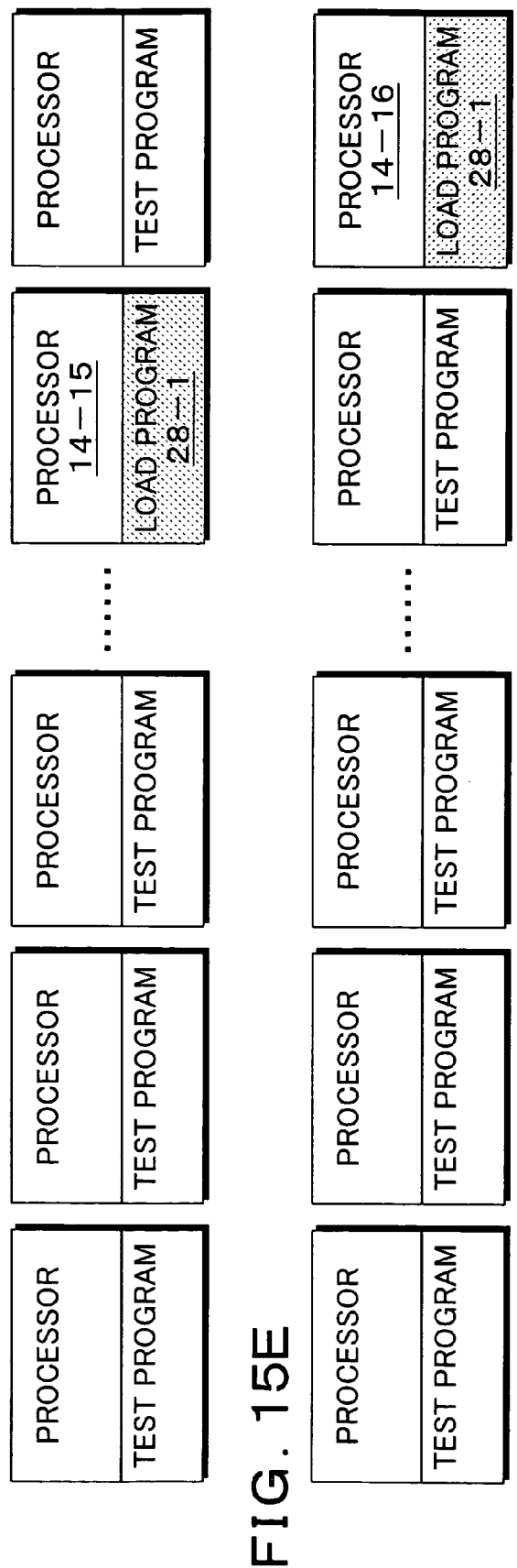

In FIG. 15A, the load program 28-1 is allocated to and executed by the processor 14-1 at the top, the test program 26-1 is allocated to and executed by all the remaining processors 14-2 to 14-16, and the execution time T2 to T16 of the test program 26-1 of the processors 14-2 to 14-16 is measured. FIG. 15B is the case in which the load program 28-1 is executed by the processor 14-2, and FIG. 15C is the case in which the load program 28-1 is executed by the processor 14-3. After that, the load program is sequentially executed by the sixteen processors in a similar manner; and, finally, the load program 28-1 is executed by the processor 14-16 as shown in FIG. 15E, and the execution time of the test program is measured for each of them.

FIG. 16 is a list of the measurement results of the execution time of the test programs measured in the process of FIGS. 15A to 15E of load effects in which the test programs and the load program are combined. In the list of the measurement results of FIG. 16, the test program execution processors 14-1 to 14-16 are disposed in the rows in the vertical direction, and the load program execution processors 14-1 to 14-16 are disposed in the lateral direction serving as the column direction. For example, in the confirmation process of load effects of FIG. 15A, the load program execution processor is 14-1, meanwhile, the test program execution processors are the processors 14-2 to 14-16. The execution time T1-2 to T1-16 of the test programs executed by the processors 14-2 to 14-16 is stored at the positions where both of them intersect with each other. When the test results of FIG. 14 are obtained by executing the test programs of FIG. 13, and the measurement results of the execution time of FIG. 16 are obtained by executing the combination programs of FIGS. 15A to 15E, a load effect is determined to be present if the combination execution time of each combination of the test program and the load program is longer than the independent execution time which is according to execution of merely the test program, and the combination of the test program and the load program at that point is determined as an effective combination. For example, the independent execution time T1 to T16 of FIG. 14 of merely the test programs and the combination execution time T1-2 to T1-16 of the case in which other processors execute the test programs are compared with each other respectively for the same processors. If all the combination execution time T1-2 to T1-16 is longer than the independent execution time T1 to T16, the combination is determined to have a load effect. Comparison with the independent execution time T1 is not performed for the processor 14-1 executing the load program at this time, since combination execution time is not obtained therefor. Other than the comparison between the independent execution time and the combination execution time in processor units, combinations having load effects may be determined by comparing the mean time of the independent execution time with the mean time of the combination execution time. When, corresponding to step S5 of FIG. 6, a load test combination program having any of the combinations of the test programs and the load programs having load effects is determined by the load test combination determination unit 30-2 of the second load test execution unit 24 in the control device 12, subsequently, the connection characteristics sorting unit 32 executes a connection characteristics sorting process in which the processors having close connection characteristics among the processors 14-1 to 14-16 serving as test objects are grouped and sorted into a plurality of processor groups.

Figure 17:
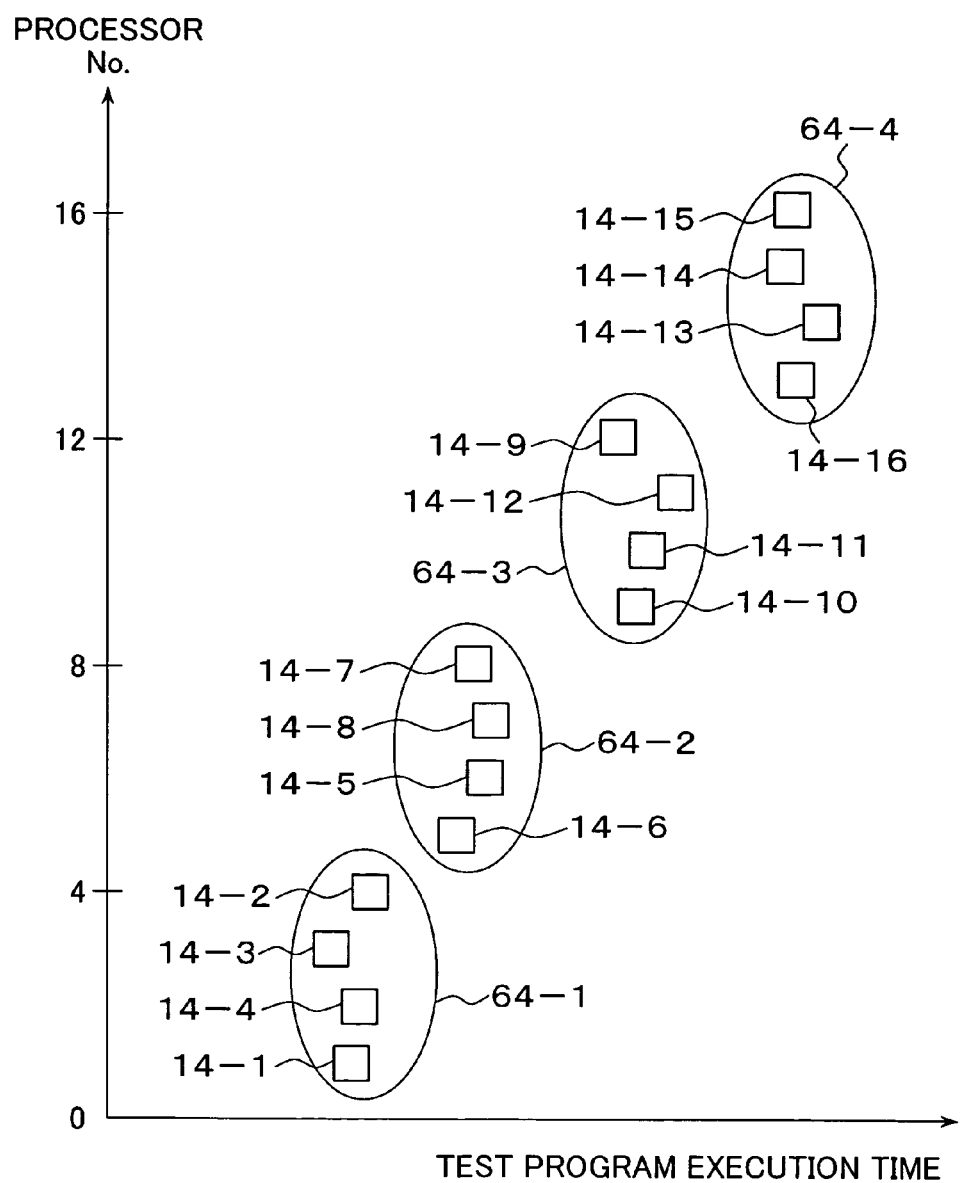
FIG. 17 is an explanatory diagram of connection characteristics sorting process of obtaining processor groups from execution time of the test program of FIG. 16.

FIG. 17 shows an arrangement of a two-dimensional space in which the horizontal axis represents test program time and the vertical axis represents the number of processors when the test program execution time is obtained for each of the sixteen processors 14-1 to 14-16 based on the list of the measurement results of the test programs and load program shown in FIG. 16. The test program execution time of each of the processors 14-1 to 14-16 obtained from the measurement result list of FIG. 16 is plotted in the manner of FIG. 17 by obtaining the mean time of the test program execution time of FIG. 16 for each of the processors. Regarding the connection characteristics of the processors 14-1 to 14-16 in terms of hardware 8 with respect to the connection mechanisms 16-1 to 16-4 of the data processing system 10-3 of FIGS. 4A and 4B serving as a test object of the second load test execution unit 24, the connection characteristics are close to one another in the processor units which are respectively connected to the connection mechanisms 16-1 to 16-4; therefore, the test program execution time in the load tests are expected to be grouped in terms of time in the connection units of the connection mechanisms 16-1 to 16-4. In the example of FIG. 17, the processors 14-1 to 14-16 disposed in accordance with the test program execution time and the processor numbers can be separated into processor groups 64-1 to 64-4 when they are grouped in particular time ranges. The processors included in the processor groups 64-1 to 64-4 correspond to the groups of the processors which are respectively connected to, in this case, the connection mechanisms 16-1 to 16-4 of FIGS. 4A and 4B. According to such connection characteristics of the processors in terms of hardware arrangement, even if whether the connection characteristics of the connection mechanisms in terms of hardware arrangement of the data processing system 10 serving as a test object have differences therebetween or not is unknown in the control device 12 of FIGS. 1A and 1B, whether the connection characteristics of the connection mechanisms have differences or not can be estimated from the distribution of the test program execution time like that of FIG. 17 which is obtained in load effect processes in which the test programs and the load program are combined. Since the distribution of FIG. 17 is separated into the plurality of processor groups 64-1 to 64-4, it is determined that the connection characteristics of the connection mechanisms have differences therebetween. On the other hand, for example, if the execution time of all the processors is included in a particular time range, they are sorted into merely one processor group. In such a case, it is determined that the connection characteristics of the connection mechanisms have no difference therebetween like the data processing system 10-1 or 10-2 of FIG. 2 or FIG. 3.

Figure 18:
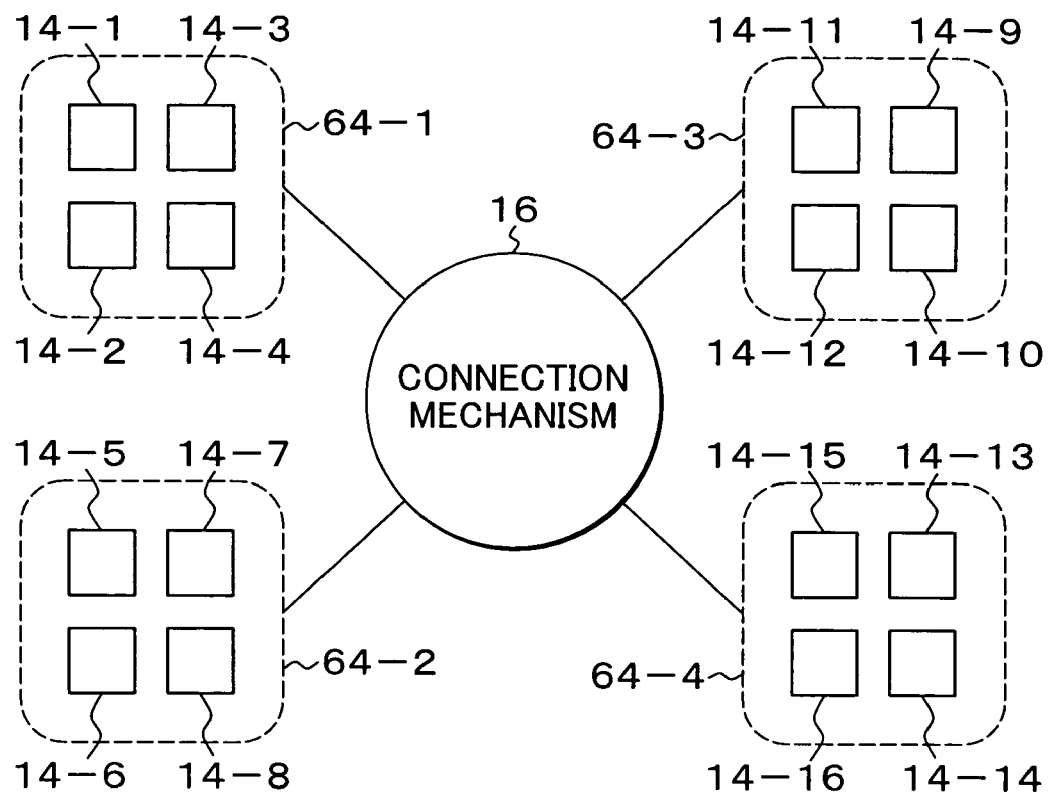
FIG. 18 is an explanatory diagram of processor groups generated in the connection characteristics sorting process of FIG. 17.

FIG. 18 is an explanatory diagram in which the processor groups 64-1 to 64-4 obtained from the distribution of the test program execution time with respect to the processor numbers shown in FIG. 17 are virtually disposed with respect to the connection mechanism 16. The hardware configuration of the connection mechanism 16 is unknown when viewed from the control device 12; however, the connection relation of the processor groups 64-1 to 64-4 which are collections of those having equivalent or close connection characteristics with respect to the connection mechanism 16 and the processors included therein can be specified. When the processor 16-1 to 16-16 are sorted into the processor groups 64-1 to 64-4 by the connection characteristics sorting process in the above described manner, the tuning process by the tuning unit 34-2 and the load test allocating process by the load test allocating unit 36-2 thereafter are executed in the units of the processor groups.

Figure 19A:
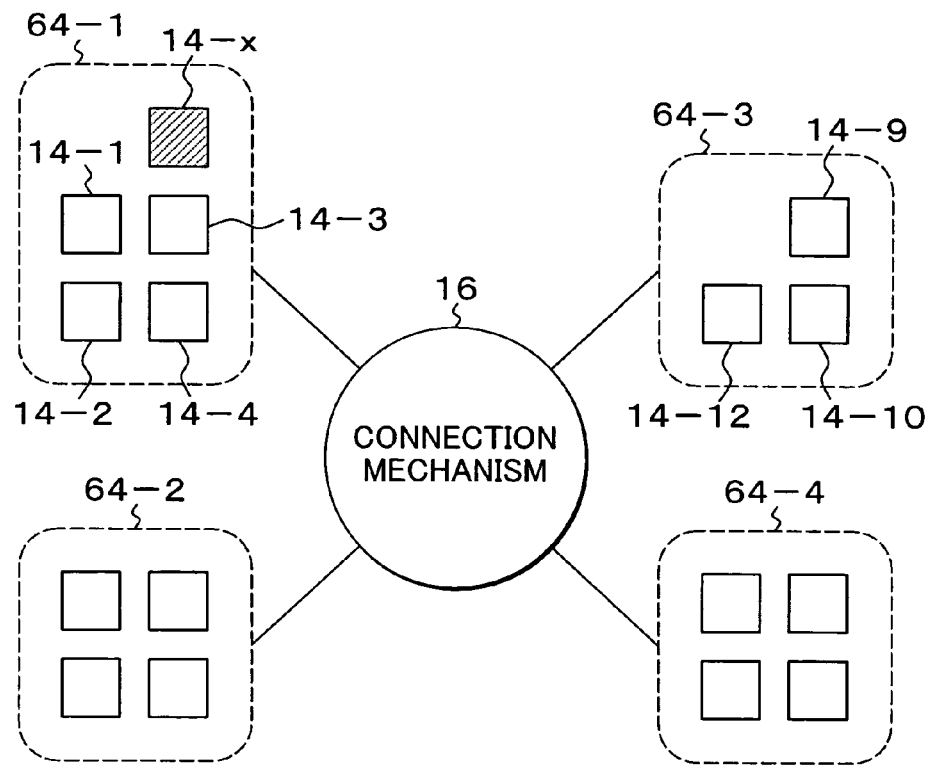
FIGS. 19A and 19B are explanatory diagrams of correction processes of sorted processor groups.
Figure 19B:
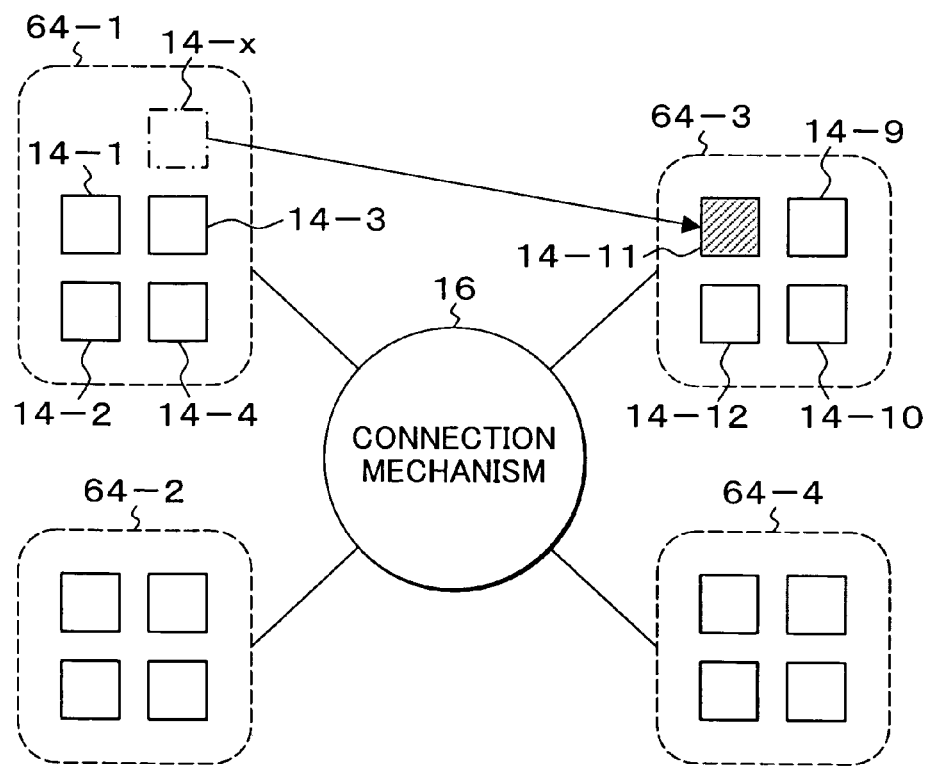

FIGS. 19A and 19B are explanatory diagrams of a correction process in which the number of the processors included in the processor groups obtained in the connection characteristics sorting process of the present embodiment is corrected. In the sorting process for specifying the processor groups of FIG. 17 based on a measurement result list like that of FIG. 16 which is obtained in the tests in which the test programs and load program are combined and load effects are determined, sometimes, for example, not four of the sixteen processor are sorted into each of the processor groups 64-1 to 64-4, for example five processors are sorted into the processor group 64-1 like FIG. 19A, and three processors are sorted into the processor group 64-3. Herein, the number of the mounted processors in terms of hardware arrangement with respect to the connection mechanisms 16-1 to 16-4 in the data processing system 10-3 as shown in FIGS. 4A and 4B is normally determined in the unit of the number of processors which is an integral multiple of $2^n$. Therefore, a minimum integral multiple E of $2^n$ is derived from the processor groups 64-1 to 64-4 which are sorted in accordance with particular ranges of the execution time of the test programs as shown in FIG. 19A, and the numbers of the processors of the processor groups 64-1 to 64-4 is corrected such that they are integral multiples of the integral multiple E. In the case of FIG. 19A, the number of the processors in each of the processors 64-2 and 64-4 is four, and the minimum integral multiple E of $2^n$ is $$E=2^n=4;$$

therefore, the processor groups are corrected such that they are integral multiples of the integral multiple E=4. For example, the number of the processors of the processor group 64-1 is five, and a remainder of 1 is left with respect to an integral multiple, that is, one time of the integral multiple E. Therefore, correction of moving the remainder 1 to the processor group 64-3 which is not in a multiple of the integral multiple E=4 as well is performed, and correction is performed such that all the numbers of the processors of the processor groups 64-1 to 64-4 after the correction are integral multiples, that is, one time of the integral multiple E=4 as shown in FIG. 19B. In the case of FIGS. 19A and 19B, correction is performed such that they are one time of the initial integral multiple E=4; however, for example, if the number of processors of a certain processor group is 7, and the number of processors of another processor group is 9, the numbers of processors are corrected such that they are two times the initial integral multiple E=4. In the performed method, as the processor moved from the processor group 64-1 to the processor group 64-3 in the manner of FIG. 19B, the processor 14-$x$ having the smallest difference with the execution time of the processors 14-9, 14-10, and 14-12 included in the processor group 64-3 of the movement destination is selected, and, for example, it is moved as the processor 14-11. The sorting of the processor groups in FIG. 17 employs a method in which certain time ranges are set for the test program execution time so as to sort it; however, they may be sorted into processor groups by sorting the test program execution time of the processors, and, when the minimum integral multiple E of $2^n$ is found, sequentially extracting the sorted processors such that the integral multiple thereof is achieved. When the sorting process of sorting all the processors into processor groups having equivalent or close connection characteristics according to the test program execution time is finished in the above described manner, the tuning process corresponding to step S7 of FIG. 6 is executed by the tuning unit 34-2 provided in the second load test execution unit 24. The tuning process is basically same as the process of the tuning process 34-1 which is provided in the first load test execution unit 22; however, the different point is that the tuning process is performed for each of the processor groups. In the tuning unit 34-2 of the second load test execution unit 24, one processor among a processor group is caused to execute a test program, the remaining processors are caused to execute load program while changing the number of the processors, the minimum number of the processors at which the execution time of the test program is not changed and saturated even when the number of the processors which execute the load programs is increased is obtained, and that is added to the load test combination program of the load test program in terms of processors as a tuning parameter. In practice, instead of sequentially increasing the number of the processors serving as load objects of the processor group which execute the load programs, the load programs are allocated to all the processors, and the minimum number of the processors at which the execution time of the test programs is saturated is obtained while reducing, from this state, the processors which execute the load programs one by one.

Figure 20A:
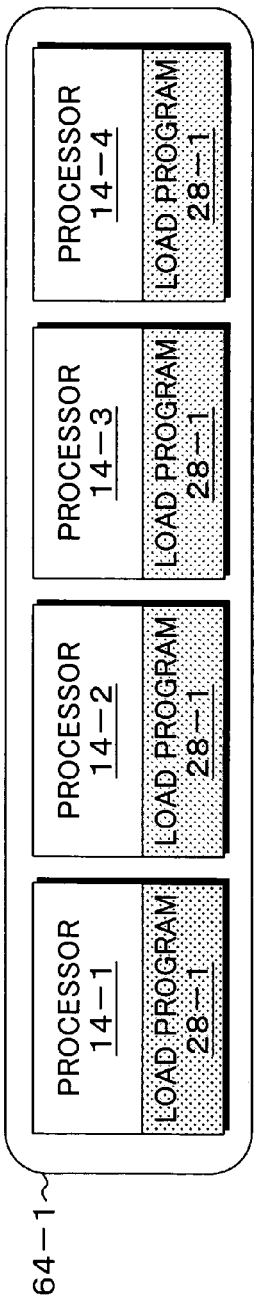
FIGS. 20A to 20D are explanatory diagrams of a tuning process of load test combination programs performed for each processor group in the case in which there is difference in connection characteristics.
Figure 20B:
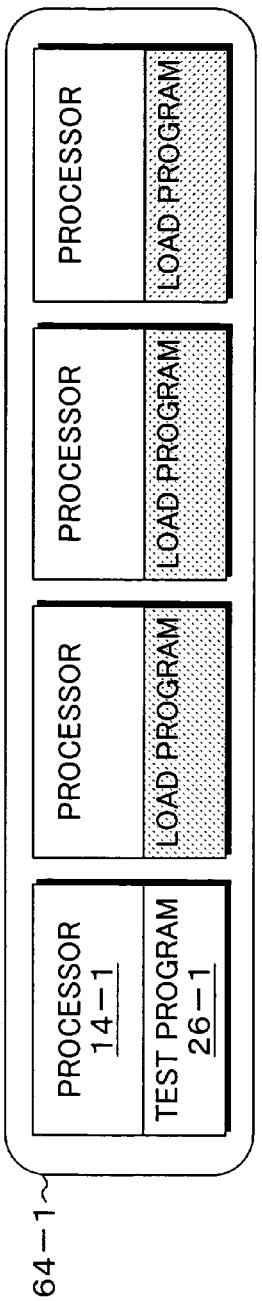
Figure 20C:
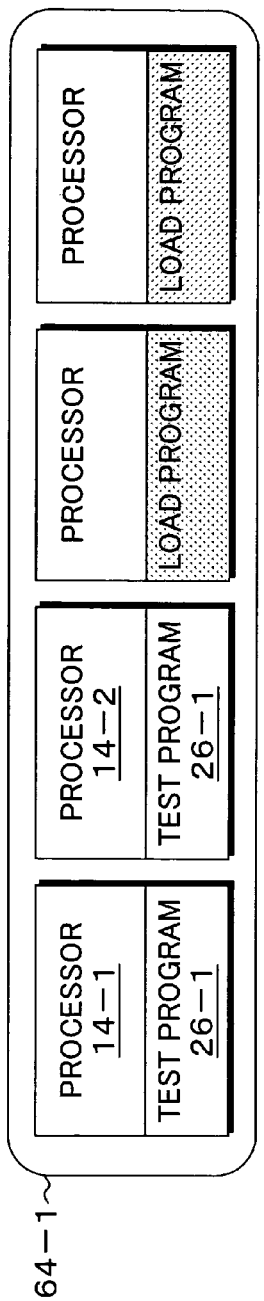
Figure 20D:
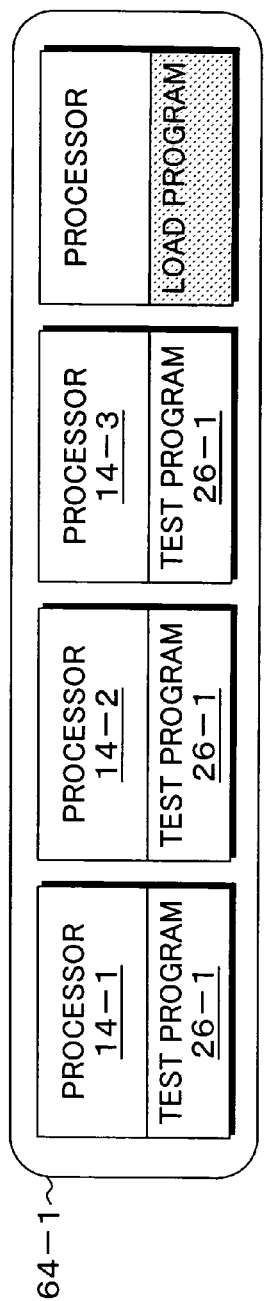

For example, as shown in FIG. 20A, the load programs 28-1 are attached to all the processors 14-1 to 14-4 of the processor group 64-1, next, the load programs are reduced by one by allocating the test program 26-1 to the processor 14-1 and executed as shown in FIG. 20B, and the programs are executed while sequentially increasing the processors which execute the test programs as shown in FIGS. 20C and 20D. The execution time of the test programs accompanying the execution of the test programs and the load programs in this state is obtained. When such process of confirming the load effects while changing the number of the processors which execute the load programs is performed in the processor group unit, for example, as shown in FIG. 10A, the saturation point 70 from which the test program execution time is not changed even when the processors are further increased is obtained at k which is in the middle of reduction from the maximum number n−1 of the number of the load program execution processors to one, and the tuning process of adding the number of the processors at the saturation point 70 to the load test program as the minimum number of the processors is executed. Meanwhile, in a certain processor group, when the saturation point from which the test program execution time is not changed even when the number of the processors which execute the load programs is changed is not obtained as shown in FIG. 10B, all the processors which can execute the load programs are fully used, the maximum number of the load allocatable processors in the processor group, that is, three for example in the processor group 64-1 of FIGS. 20A to 20D is added to the load test combination program as the minimum number of the processors. Then, the tuning process as shown in FIGS. 20A to 20D is similarly repeated for the remaining processor groups 64-1 to 64-4, and the minimum numbers of the processors are added to respective load test programs so as to perform tuning.

Figure 22:
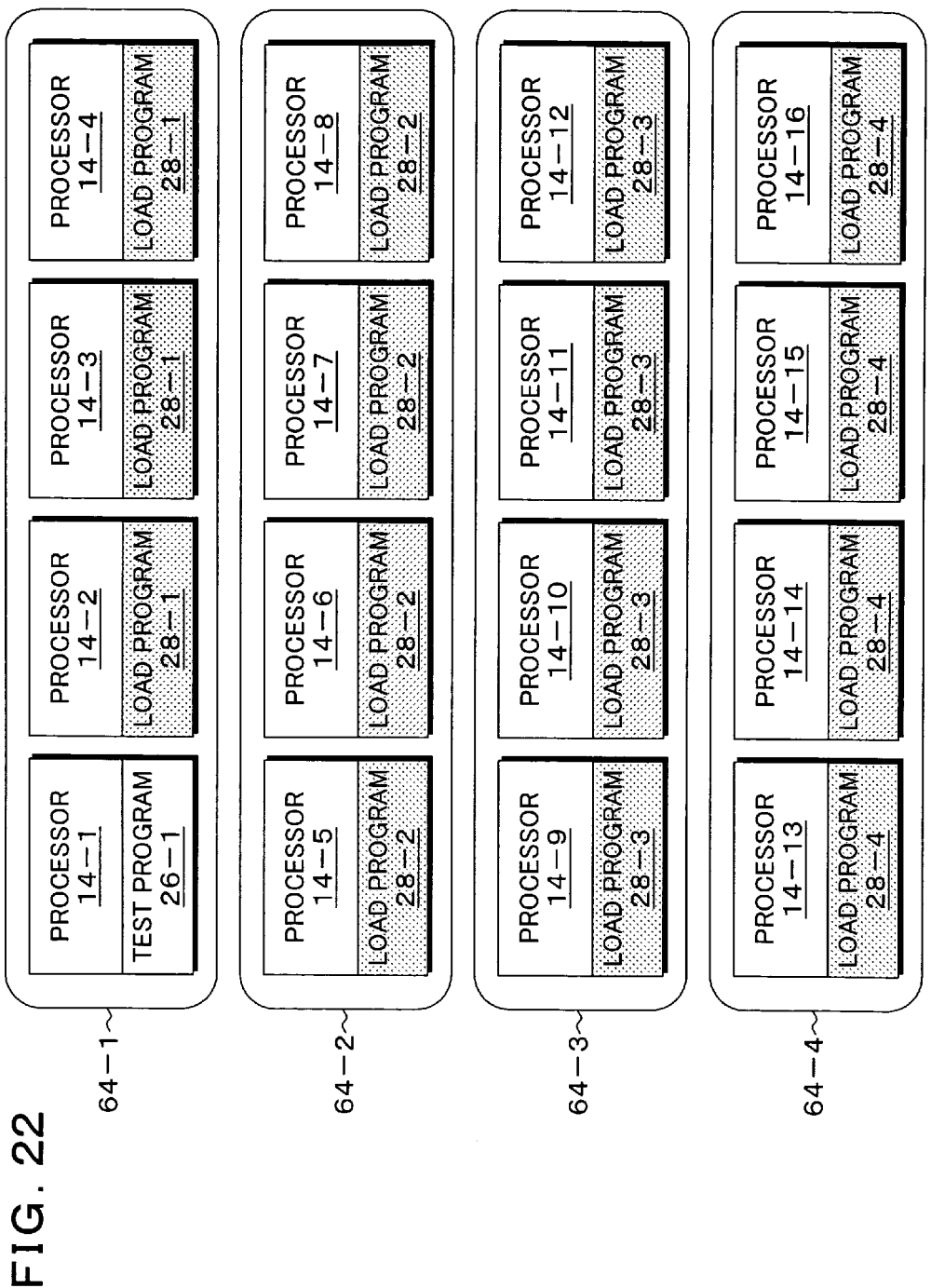
FIG. 22 is an explanatory diagram of a program allocation process upon load test execution with respect to processor groups in the case in which the minimum number of processors obtained in the tuning process of FIGS. 20A to 20D fully uses all the processors for load allocation.

FIGS. 21A to 21D are explanatory diagrams of another tuning process performed for the processor group. In this embodiment, a process of tuning a load test combination program, which is a combination with a test program, by using two load programs 28-1 and 28-2 as load programs having load effects is shown. Also in this case, for example in the state in which the load programs 28-1 and 28-2 are allocated to all the processors 14-1 to 14-4 of the processor group 64-1 as shown in FIG. 21A, at the beginning, one processor 14-1 is caused to execute the test program 26-1 and all the remaining processors are caused to execute the load programs 28-1 and 28-2 as shown in FIG. 21B, the execution time of the test programs is measured thereafter while increasing the processors which execute the test programs as shown in FIGS. 21C and 21D, in other words, while reducing the processors which execute the load programs 28-1 and 28-2, and the load test combination program is tuned by obtaining the minimum number of the processors and adding the number thereto. Then, when the tuning of the load test combination program is finished, a long-time load test is executed by the load test allocating unit 36-2 corresponding to step S8 of FIG. 6 by prioritizing the test program and load programs having high load effects in allocation to the plurality of processors in accordance with the tuned load test combination programs. The process by the load test allocation processing unit 36-2 can be separated into a process of the first load test allocating unit 38-2 and a process of the second load test allocating unit 40-2. First of all, the first load test allocating unit 38-2 is for the case in which either condition of (1) the case in which the minimum number of the processors of load saturation according to the combination program which is tuned for the processor group in which the test program is present fully uses all the processors which can execute the load programs in the processor group or (2) the case in which not all the processors are fully used, and there is merely one test program is satisfied. In this case, as shown in FIG. 22, when the test program is disposed in the processor group 64-1, the test program 26-1 is allocated to one processor 14-1 of the processor group 64-1, the load programs are allocated to the remaining processors 14-2 to 14-4, and they are caused to execute a long-time load test. At the same time, regarding the processor groups 64-2 to 64-4 in which no test program is disposed, the load programs 28-2, 28-3, and 28-4 of the load test combination programs which are tuned for the respective processor groups are allocated to all the processors in the respective processor groups, and they are caused to execute a long-time load test.

Herein, FIG. 22 employs, as an example, a long-time load test which is based on the load test combination program obtained in the tuning of FIGS. 20A to 20D. On the other hand, in the case of the load test combination program obtained by the tuning using the two load programs 28-1 and 28-2 shown in FIGS. 21A to 21D, it is as shown in FIGS. 23A and 23B.

Figure 23A:
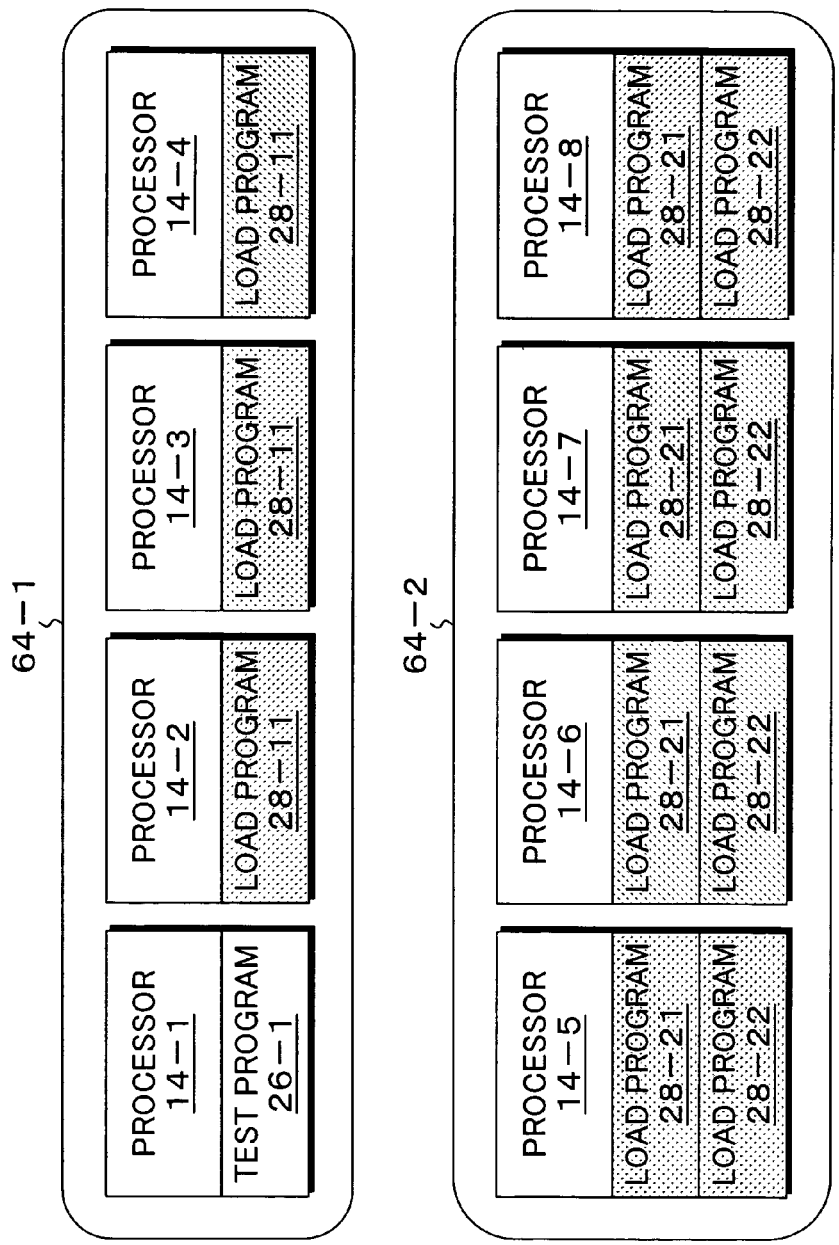
FIGS. 23A and 23B are explanatory diagrams of a program allocating process upon load test execution in the case in which the minimum number of processors obtained in the tuning process of FIGS. 21A to 21D fully uses all the processors for load allocation.
Figure 23B:
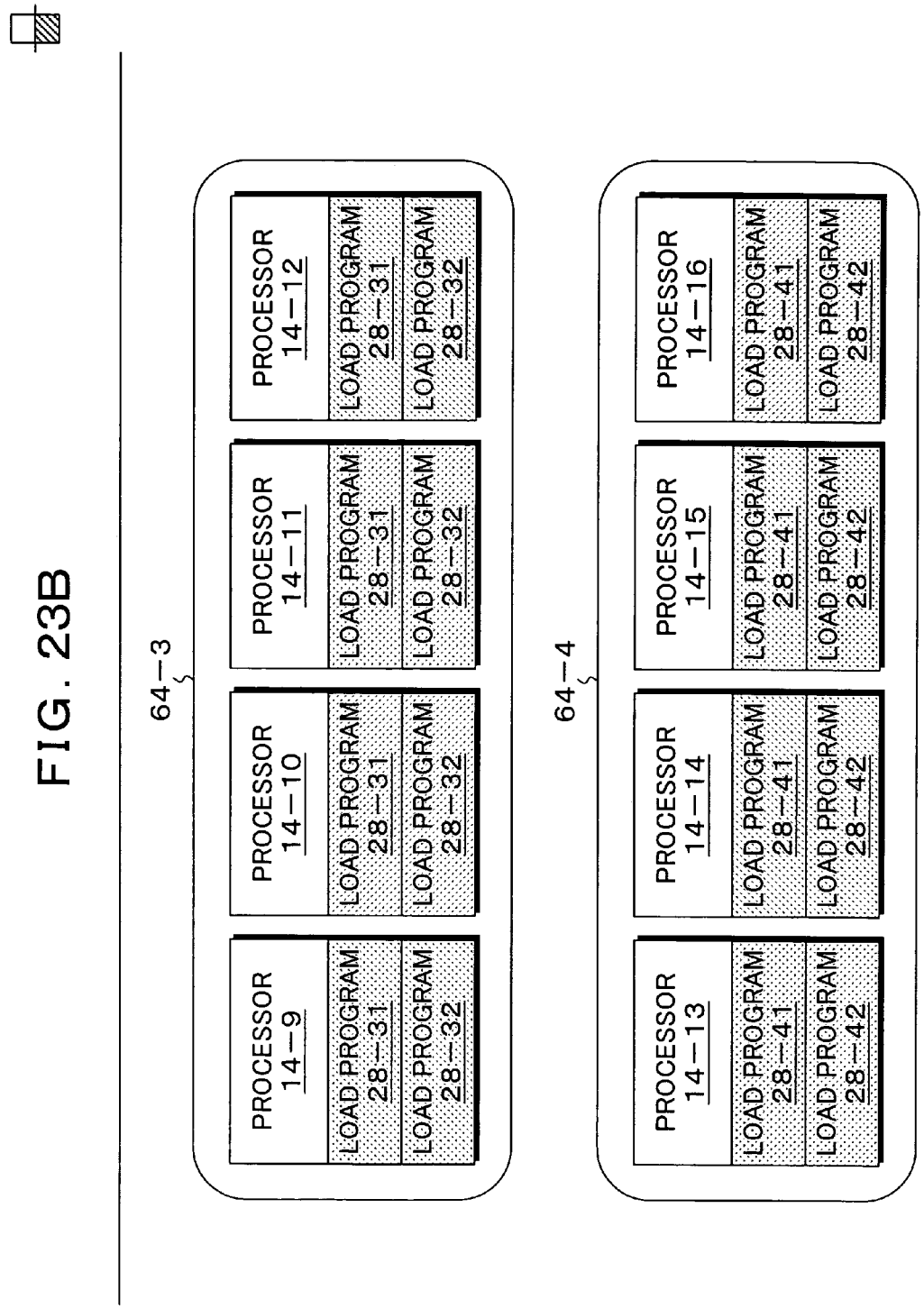
Figure 24:
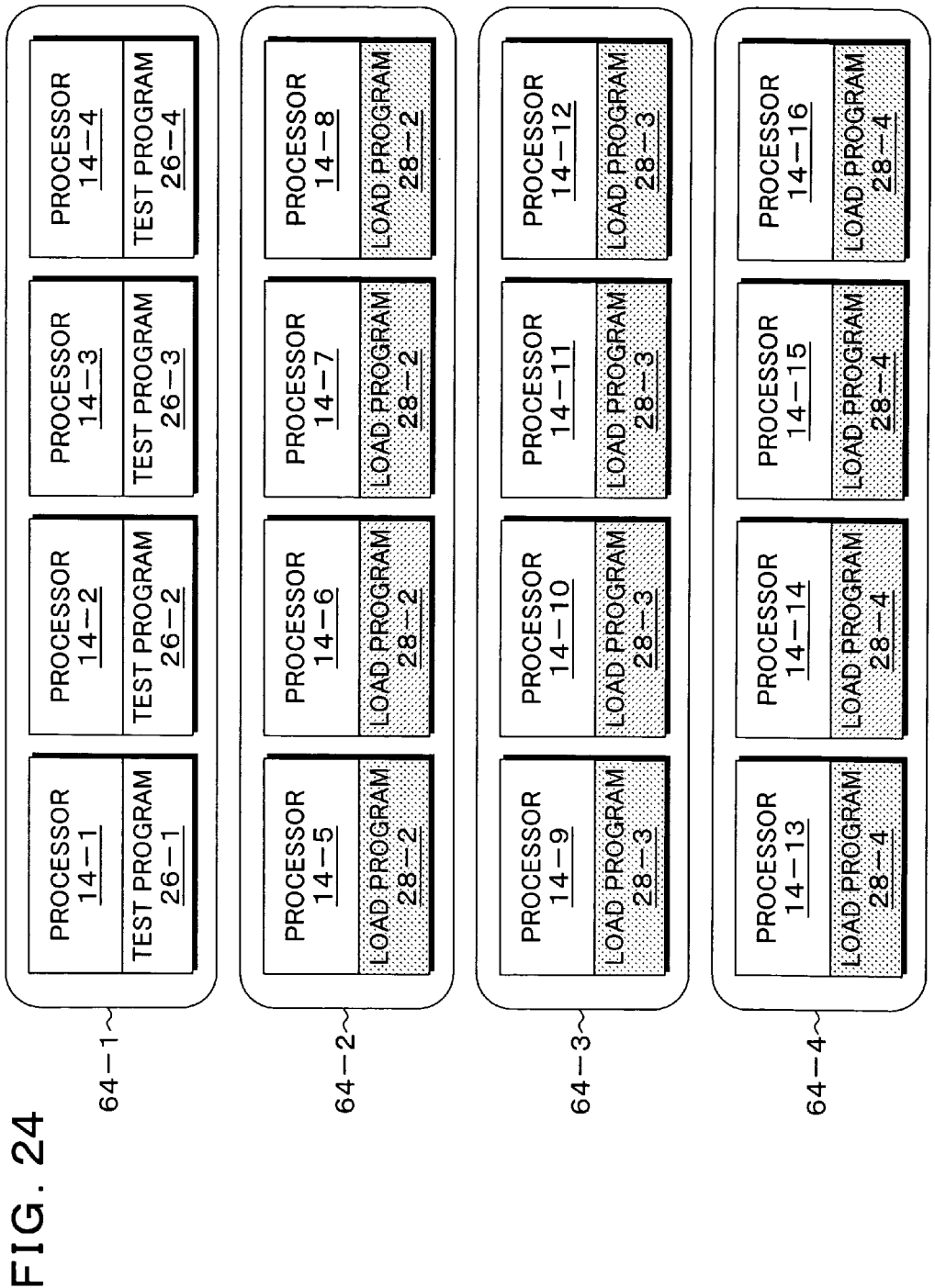
FIG. 24 is an explanatory diagram of a program allocating process upon load test execution in the case in which the minimum number of processors obtained in the tuning process does not fully use all the processors for load allocation.

In the first load test process of FIGS. 23A and 23B, if the processor in which the test program is disposed is in the first processor group 64-1, the test program 26-1 is allocated to the processor 14-1 from the processor group 64-1, and the load programs 28-1 are allocated to all the remaining processors 14-2 to 14-4. At the same time, regarding the processor groups 64-2 to 64-4 in which no test program is disposed, two load programs 28-1 and 28-22, load programs 28-31 and 28-32, or load programs 28-41 and 28-42 obtained in the tuning process of FIGS. 21A to 21D for each of the processor groups are allocated to respective processor groups, and a long-time load test is executed in the state in which the test program and the load programs are allocated. In the test load allocation process of the present embodiment, allocation of the test program and load programs having a high load effect is prioritized to execute a long-time load test; therefore, when the load tests of FIGS. 22, 23A and 23B are possible, execution of the load test of FIGS. 23A and 23B having a high load effect is prioritized. Next, the process by the second load test allocating unit 40-2 of FIGS. 1A and 1B is for the case in which two conditions that (1) the minimum number of the processors according to the combination program tuned for the processor group in which the test program is present does not fully use all the processors which can execute the load programs and (2) a plurality of test programs which belong to the load test combination program of the same configuration are present are satisfied. In this case, as shown in FIG. 24, in the processor group 64-1 which is the processor group in which the test programs are present, if the test programs obtained by the load test combination program of the same configuration are four test programs 26-1 to 26-4, the test programs 26-1 to 26-4 are respectively allocated to the processors 14-1 to 14-4. Meanwhile, regarding the other processor groups 64-2 to 64-4 in which no test program is present, the respectively-tuned load programs 28-1 to 28-4 are allocated to all the processors in the respective processor groups, and a long-time load test is executed in the state in which the test programs and the load programs are allocated.

Figure 25A:
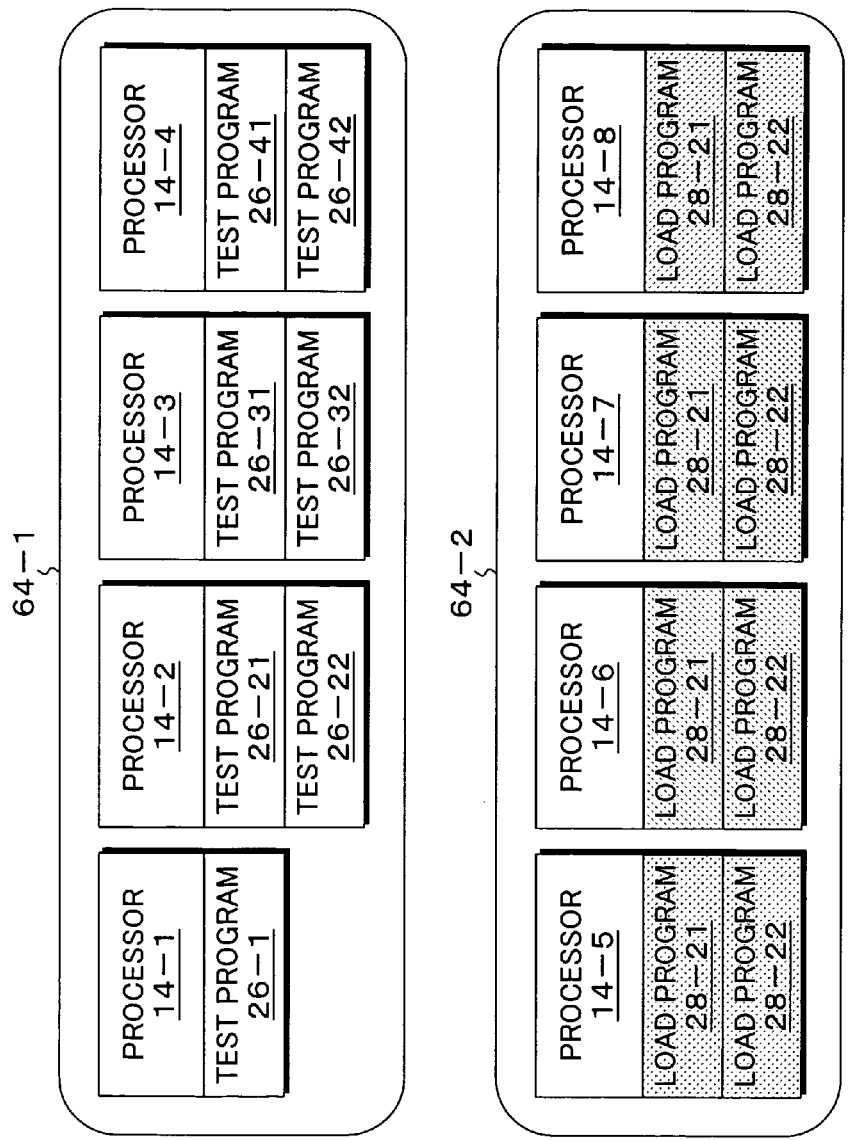
FIGS. 25A and 25B are explanatory diagrams of a program allocating process upon load test execution in the case in which the minimum number of processors obtained in the tuning process does not fully use all the processors for load allocation.
Figure 25B:
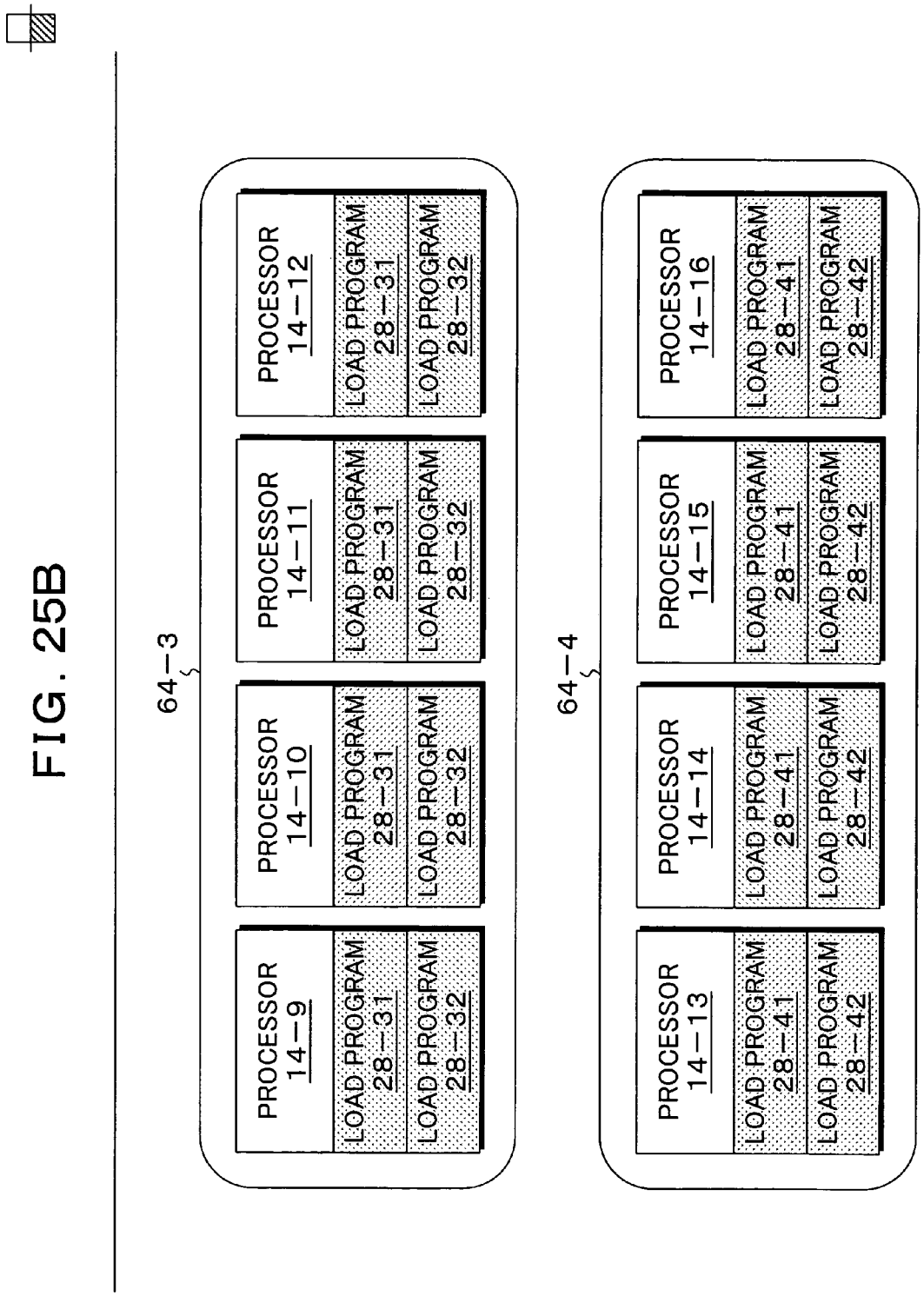

FIGS. 25A and 25B explain another process by the second load test allocating unit 40-2. In this process, the test program 26-1 is allocated to the processor 14-1 of the processor group 64-1 in which the test programs are disposed, and, at the same time, two test programs 26-21 and 26-22, test programs 26-31 and 26-32, or test programs 26-41 and 26-42 are allocated to and executed by each of the processors 14-2 to 14-4. At the same time, two load programs 28-21 and 28-22, load programs 28-31 and 28-32, or load programs 28-41 and 28-42 are allocated to and executed by each of the processor groups 64-2 to 64-4 in which no test program is disposed. When the load tests of FIGS. 24, 25A and 25B are compared with each other herein, since that of FIGS. 25A and 25B has a larger load effect, it is prioritized to execute a long-time load test. The long-time load tests of FIGS. 22 to 25B performed by allocating the test program and load programs for each of the processor groups are examples, and an executable tuned load test program is selected such that the maximum load effect is achieved to perform a long-time load test.

FIG. 26A to FIG. 26E are flow charts showing details of processing procedures according to the test program of the present embodiment, and they will be described below with reference to FIGS. 1A and 1B.

Figure 26A:
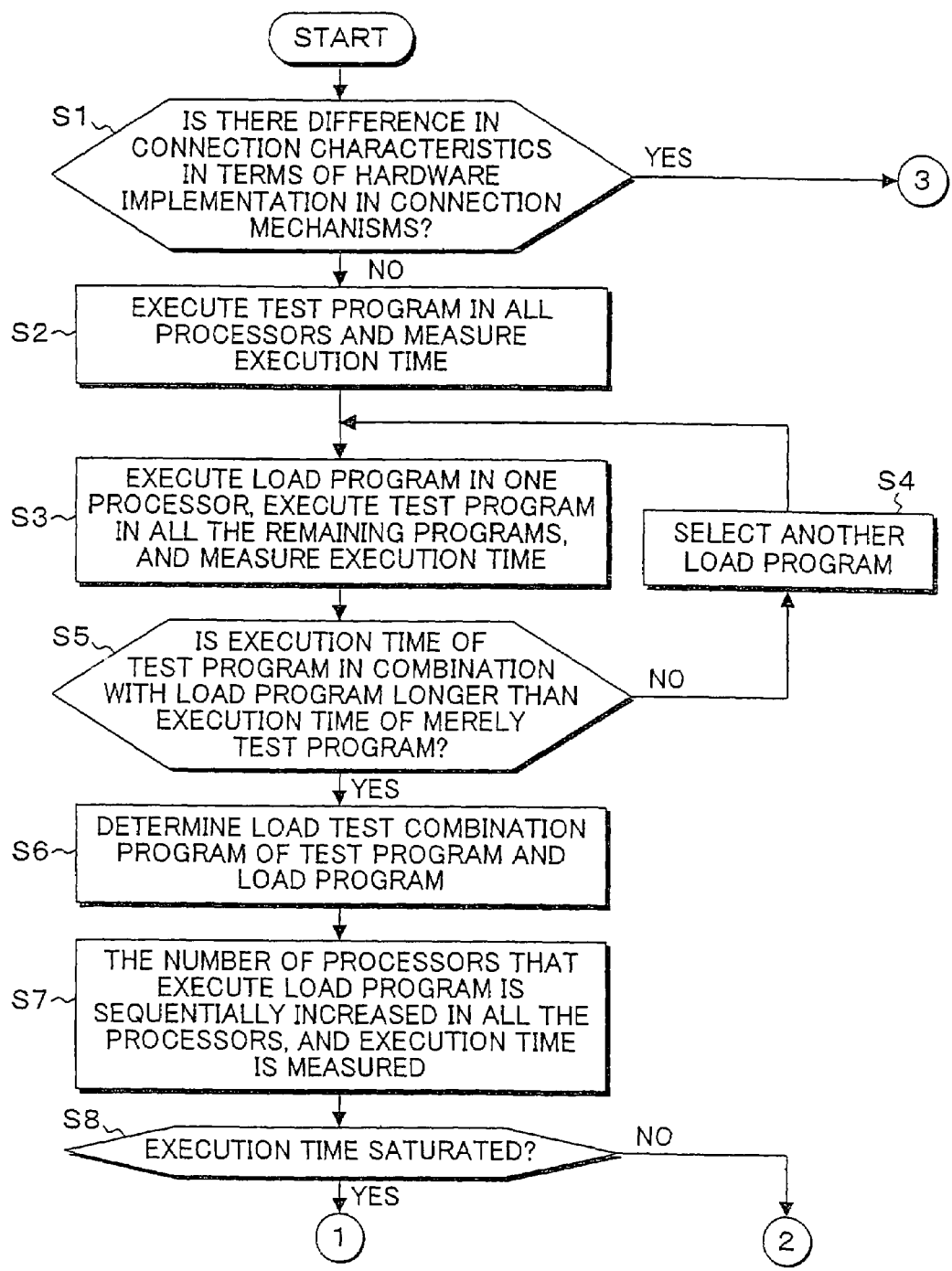
FIG. 26A is a flow chart showing details of a processing procedure according to the test method of the present embodiment.
Figure 26B:
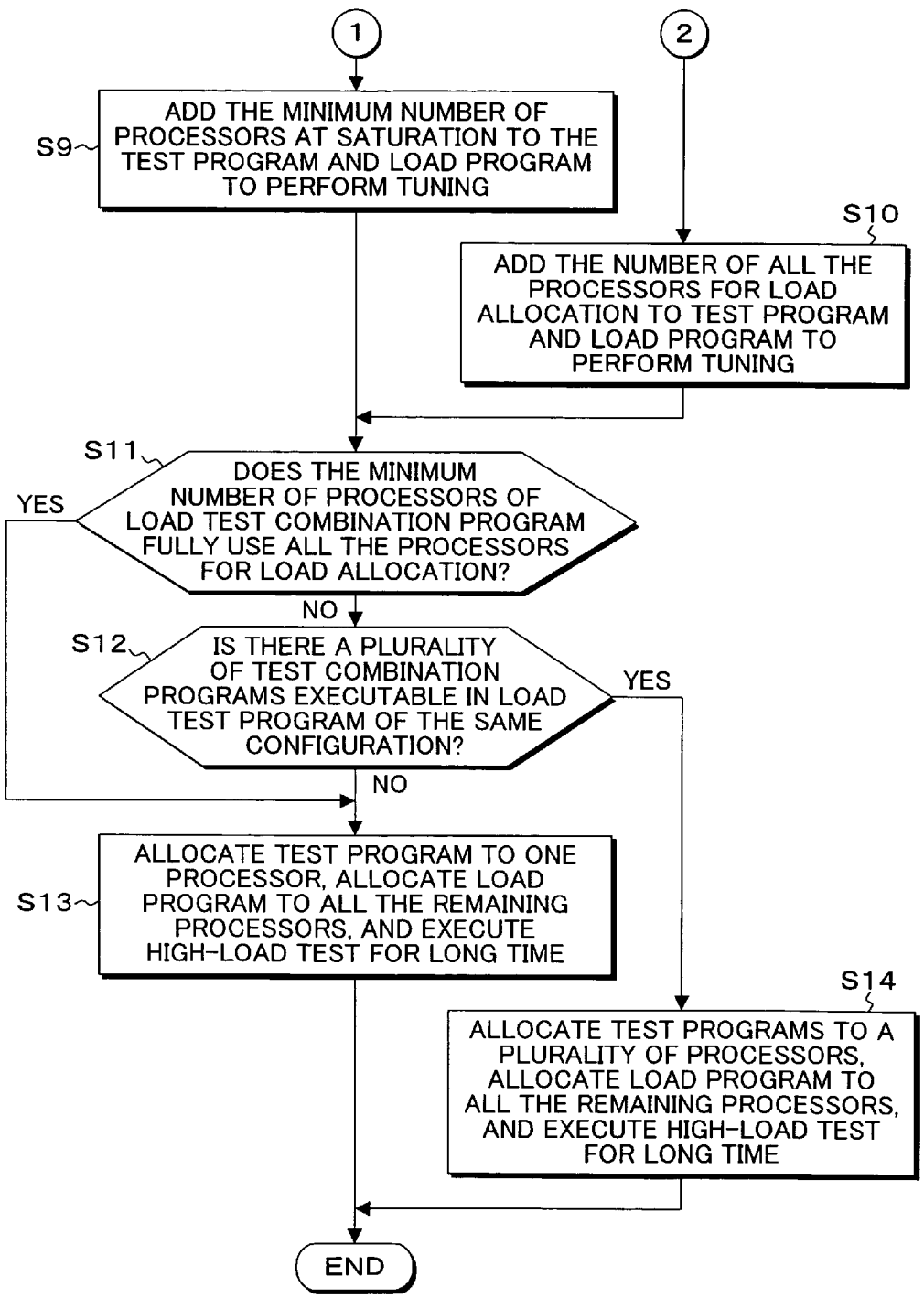
FIG. 26B is a flow chart showing details of the processing procedure subsequent to FIG. 26A.

In FIG. 26A, whether it is apparent or not that the connection mechanisms of the data processing system 10 serving as a test object have differences in connection characteristics in terms of hardware implementation is determined. This process is same as the process of step S1 of FIG. 6. When it is apparent that the connection characteristics in terms of hardware implementation have no differences therebetween, the processes by the first load test execution unit 22 shown in step S2 to step S14 of FIG. 26B are executed. The processes of steps S2 to S14 are those showing details of the processes of steps S2 to S4 of FIG. 6. In the processes by the first load test execution unit 22, in step S2, for example as shown in FIG. 7A, the test programs 26-1 are executed by all the processors 14-1 to 14-8, and the execution time is measured. Next, in step S3, for example as shown in FIG. 7B, the load program is executed by one processor 14-8, the test programs 26-1 are executed by all the remaining processors 14-1 to 14-7, and the execution time is measured. Subsequently, in step S5, whether the execution time of the test program combined with the load program is longer than the execution time of merely the test program or not is compared and determined. If it is longer, in step S6, it is determined to have a load effect, and a load test combination program of the test program and the load program is determined. If the load effect is not obtained in step S5, another load program is selected in step S4, and the processes from step S3 are repeated. The processes of steps S2 to S5 are the processes by the load test combination determination unit 30-1 of FIGS. 1A and 1B. Next, in step S7, the number of the processors which execute the load programs is sequentially increased by the tuning unit 34-1 in all the processors 14-1 to 14-8 for example as shown in FIGS. 9A to 9D, and the execution time is measured. When the execution time is saturated in step S8, in step S9, the minimum number of the processors at the point of saturation is added to the load test combination program which is composed of a combination of the test program and the load program determined in step S6 so as to perform tuning. Meanwhile, if the execution time is not saturated in step S8, the number of all the processors which are for load allocation is added to the load test combination program in which the test program and the load program are combined so as to perform tuning in step S10.

Subsequently, the process proceeds to step S11 of FIG. 26B, in which whether the minimum number of the processors of the load test combination program fully uses all the processors for load allocation or not is determined. If they are fully used, the process proceeds to step S13, in which, for example as shown in FIG. 11A, program allocation is performed such that the test program 26-1 is executed by one processor 14-1 and the load programs 28-1 are executed by all the remaining processors 14-2 to 14-8, so as to execute a high-load test for a long time. Meanwhile, if the minimum number of the processors of the load test combination program does not fully use all the processors for load allocation in step S11, whether a plurality of test programs which can be executed by the load test combination program of the same configuration are present or not is checked in step S12. If they are plural, the process proceeds to step S14, in which, for example as shown in FIG. 12A, the test programs 26-1 and 26-2 are allocated to the plurality of processors 14-1 and 14-2, the load programs 28-1 are allocated to all the remaining processors 14-3 to 14-8, and a high-load test is executed for a long time. On the other hand, if not plural but merely one test program which is executable by the load test combination program of the same configuration is present in step S12, the process proceeds to step S13, in which, as shown in FIG. 11A, a high-load test in which the test program is executed by one processor and the load programs are executed by all the remaining processors is executed for a long time.

Figure 26C:
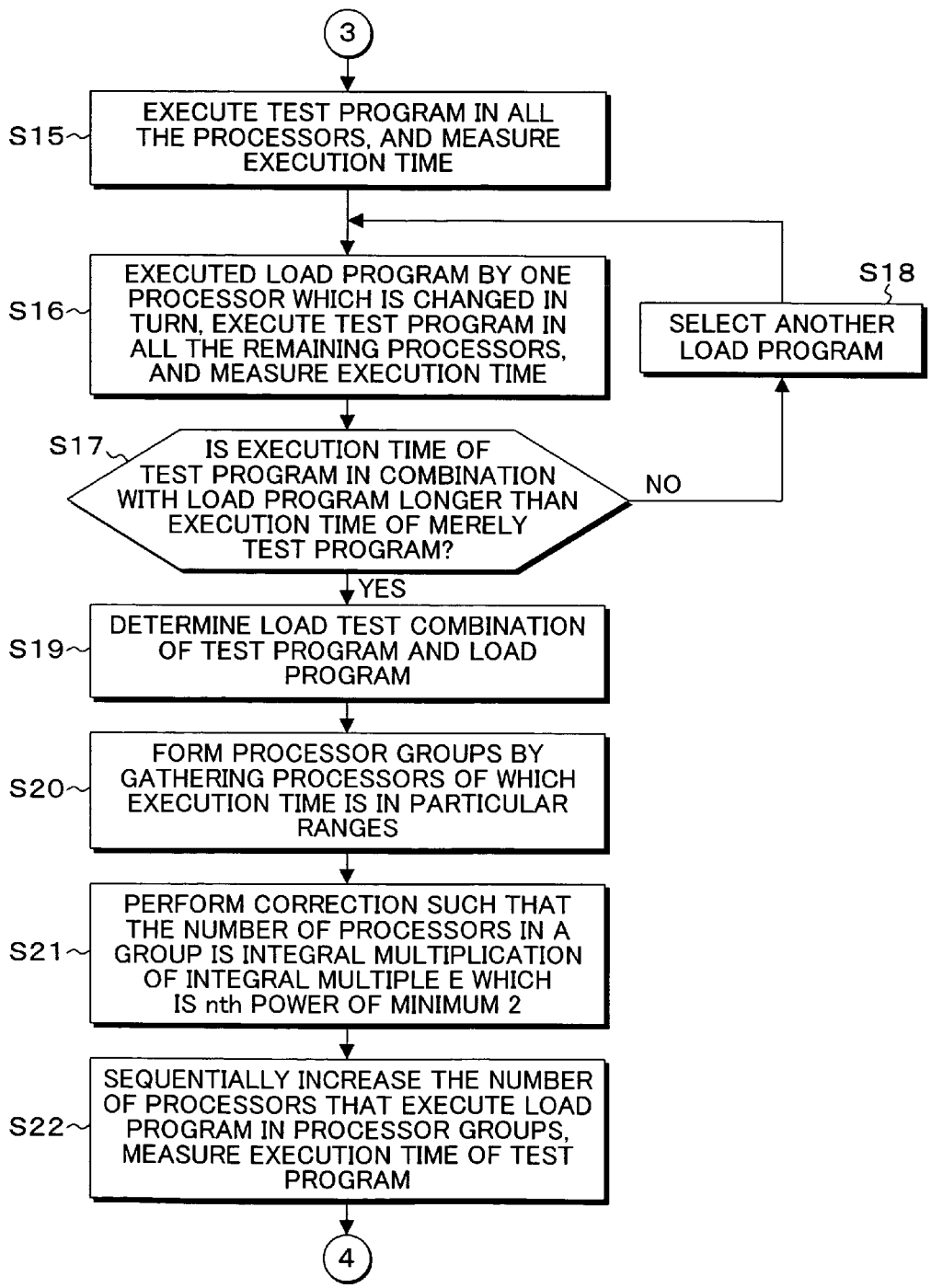
FIGS. 26C and 26D are flow charts showing details of the processing procedure subsequent to FIG. 26B.
Figure 26D:
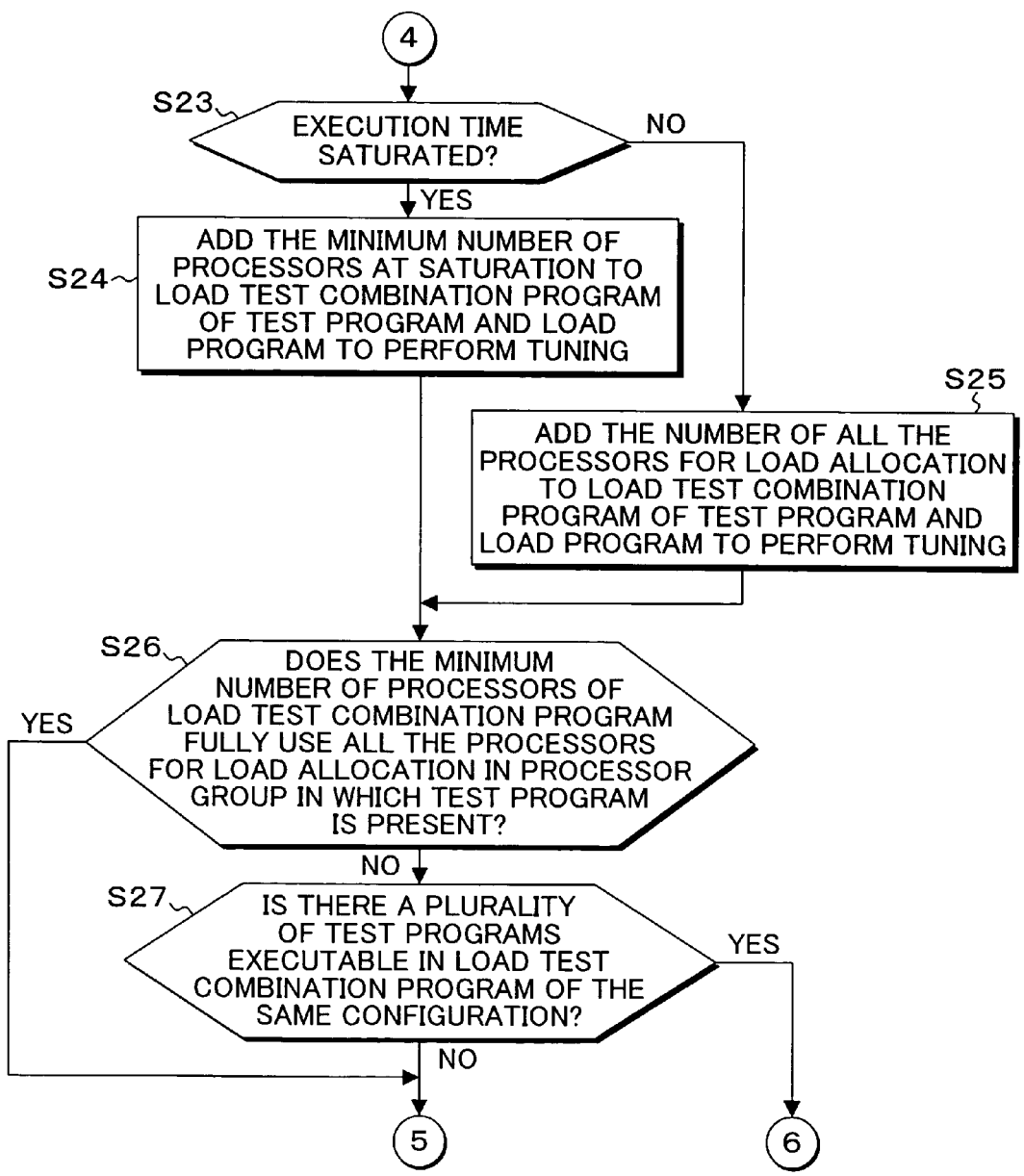
Figure 26E:
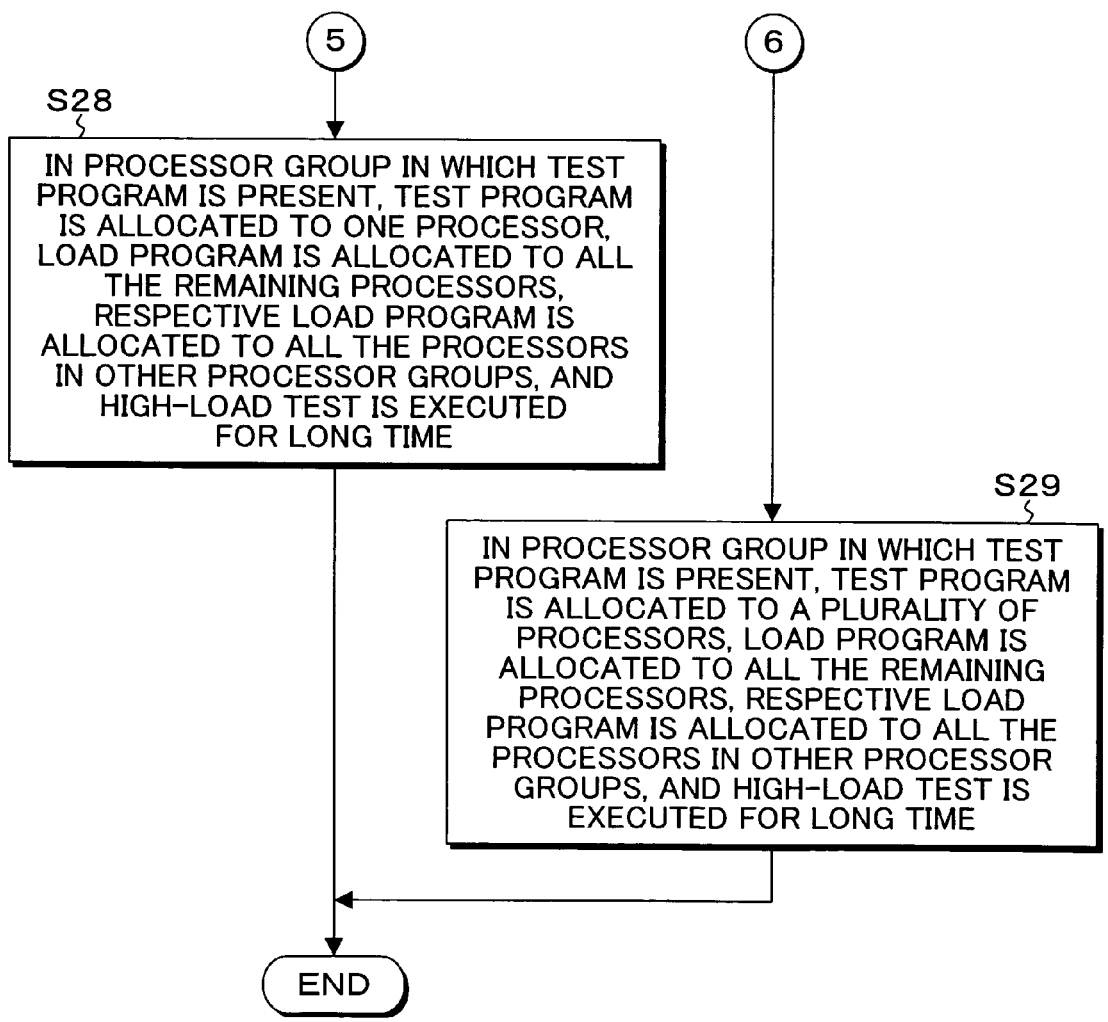
FIG. 26E is a flow chart showing details of the processing procedure subsequent to FIGS. 26C and 26D.

Referring again to FIG. 26A, in step S1, if it is unknown that the connection mechanisms of the data processing system serving as a test object have differences in the connection characteristics in terms of hardware implementation, the processes of step S15 of FIGS. 26C and 26D to step S29 of FIG. 26E are executed. The processes of steps S15 to S29 are the processes of the second load test execution unit 24 provided in the control device 12 of FIGS. 1A and 1B, and details of the processing procedures of steps S5 to S8 of FIG. 6 will be shown.

In step S15 of FIGS. 26C and 26D, as shown in FIG. 13, the test programs 26-1 are executed by all the processors 14-1 to 14-16, and the execution time is measured. Then, in step S16, the load program is executed by one processor while changing the processor as shown in FIGS. 15A to 15E, the test programs are executed by all the remaining processors, and the execution time is measured. Subsequently, in step S17, whether the execution time of the test program combined with the load program is longer than the execution time of merely the test program or not is determined. If it is longer, it is assumed to have a load effect, and, in step S19, the combination of the test program and the load program is assumed to be effective to determine a load test combination program. If the load effect is not exerted in step S17, another load program is selected in step S18, and the processes from step S16 are repeated. The processes of steps S15 to S18 are the processes by the load test combination determination unit 30-2 provided in the second load test execution unit 24 of FIGS. 1A and 1B. Next, in step S20, the processors in particular ranges of the execution time according to combination execution of the test program and the load program are collected, and processor groups are formed by performing connection characteristics sorting processes of grouping them into the processor groups 64-1 to 64-4 for example like FIG. 17. Subsequently, in step S21, as shown in FIGS. 19A and 19B, the numbers of the processors in the formed processor groups are corrected to be integral multiples of a minimum integral multiple E of $2^n$. The processes of steps 20 and 21 are the processes by the connection characteristics sorting unit 32 of FIGS. 1A and 1B. Next, in step S22, the number of the processors which execute the load programs is sequentially increased for the sorted processor groups, and the execution time of the test programs is measured. In this process, in practice, for example as shown in FIGS. 20A to 20D or FIGS. 21A to 21D, the execution time of the test programs is measured while sequentially reducing the number of the processors which execute the load programs in the state in which the load programs are allocated to all the processors of the processor group. Subsequently, in step S23, whether the execution time is saturated or not is determined, and if it is saturated, the minimum number of the processors at the point of saturation is added to the load test combination program to perform tuning in step S24. On the other hand, if the execution time is not saturated, the number of all the processors which are for load allocation is added to the load test combination program as a minimum number of the processors to perform tuning in step S25. The processes of steps S22 to S25 are the processes of the tuning unit 34-2 of FIGS. 1A and 1B.

Next the process proceeds to step S26 of FIG. 26E, in which whether the minimum number of the processors of the load test combination program tuned for the processor group in which the test program is present fully uses all the processors for load allocation or not is determined. If it they are fully used, the process proceeds to step S28, in which, for example as shown in FIG. 22, the test program 26-1 is allocated to one processor 14-1 in the processor group 64-1 in which the test program is present, and the load programs 28-1 are allocated to all the remaining processors 14-2 to 14-4. Furthermore, in the other processor groups 64-2 to 64-4, the load programs 28-2, 28-3, and 28-4 obtained from the respective load test combination programs are allocated, and a high-load test is executed for a long time in this state. Meanwhile, in step S26, if the minimum number of the processors of the load test combination program does not fully use all the processors for load allocation in the processor group in which the test program is present, the process proceeds to step S27, in which whether a plurality of test programs executable by the load test combination program of the same configuration are present or not is determined. If they are plural, the process proceeds to step S29. In step S29, for example regarding the processor group 64-1 in which the test programs are present as shown in FIG. 24, for example if there are four test programs 26-1 to 26-4, the test programs 26-1 to 26-4 are allocated to the plurality of processors 14-1 to 14-4, respectively; and, in this case, if the number of the test programs is less than all the processors of the processor group 64-1, load programs are allocated to all the remaining processors. Regarding the other processor groups 64-2 to 64-4, the respective load test combination programs are allocated to all the processors, and a high-load test is executed for a long time in this allocation state. The processes of steps S26 to S29 are performed by the first load test allocation unit 38-2 and the second load test allocation unit 40-2 of FIGS. 1A and 1B. In the above described embodiments, when the load test is to be started, for example as shown in step S1 of FIG. 6, whether it is apparent or unknown that the connection characteristics in terms of hardware arrangement of the connection mechanisms of the data processing system serving as a test object have differences therebetween is determined, and the processes are separately performed for the apparent case and the unknown case; however, the connection characteristics in all the connection mechanisms may be left unknown without performing such determination process of the presence of the differences in the connection characteristics of the connection mechanisms, the processes of steps S4 to S8, i.e., the processes merely by the second load test execution unit 24 of FIGS. 1A and 1B may be performed. In the processes merely by the second load test execution unit 24, the process of grouping into processor groups can be performed by separation into certain ranges of execution time according to the distribution of the test program execution time obtained in the test of confirming load effects by the connection characteristics sorting unit 32. If merely one processor group is generated when the process of grouping into the processor groups is performed, the process will be that for the connection mechanisms of the data processing system 10-1 of FIG. 2 or the data processing system 10-2 of FIG. 3 having no difference in the connection characteristics, and the process which is substantially same as the first load test execution unit 22 can be performed by executing the process in which all the processors are in one processor group. As a matter of course, when it is apparent in advance that the connection mechanisms have no difference in the connection characteristics like FIG. 2 or FIG. 3, for example it may be retrieved and determined as an answer to a question request to an operator as a process of the connection characteristics determination unit 20, thereby achieving a merit that the process is simplified in the amount corresponding to the unrequired process by the connection characteristics sorting unit 32 in the second load test execution unit 24. The present invention includes arbitrary modifications that do not impair the object and advantages thereof and is not limited by the numerical values shown in the above described embodiments.

What is claimed is:

1. A test method of a data processing system in which a plurality of processors are mutually connected by one or a plurality of connection mechanisms, the test method comprising:

a connection characteristics determination step in which whether the connection mechanisms are different in connection characteristics in terms of hardware implementation is determined; and a first load test execution step in which, if the connection characteristics of the connection mechanisms have no difference therebetween, a load test combination program in which a first test program and a first load program having a first load effect are combined is determined for all the processors, so as to execute a long-time load test, the first load test execution step including:

a first load test combination determination step in which execution time of a no-load state in which merely the first test program is executed by all the processors is compared with execution time of a loaded state of the first test program when the first test program is executed by one of the processors and the first load program is executed concurrently by all remaining processors, where, if the execution time of the loaded state is longer than the execution time of the no-load state, the first load program is determined to have a first load effect, and a first load test combination program is determined in which the first test program and the first load program are combined;

a first tuning step in which, with respect to the first load test combination program, one of the processors is caused to execute the first test program, the remaining processors are caused to execute the first load program while changing the number of the processors, to obtain a minimum number of the processors at which the execution time of the first test program is saturated and not changed even when the number of the processors executing the first load program is increased, and the minimum number of the processors and a determination result are added to the first load test combination program to provide a first tuned load test combination program; and a load test allocation step in which, in accordance with the first tuned load test combination program, the first test program and the first load program having a high load effect are prioritized in allocation to the processors.

2. The test method of the data processing system according to claim 1, wherein the load test allocation step comprises:

a first load test allocating step in which, if the minimum number of the processors of the first tuned load test combination program fully uses all the processors which can execute the first load program, or if not all the processors are fully used and there is only one of the first test program, the first test program is allocated to one of the processors, and the first load program is allocated to all the remaining processors, so as to execute a first long-time load test; and a second load test allocating step in which, if the minimum number of the processors of the first tuned load test combination program does not fully use all the processors which can execute the first load program and a plurality of test programs which belong to the first load test combination program of a same configuration are present, the test programs are allocated to the processors and the first load program is allocated to all the remaining processors, so as to execute a second long-time load test.

3. The test method of the data processing system according to claim 1, further comprising a second load test execution step in which, if the connection characteristics of the connection mechanisms have a difference therebetween, a second load test combination program in which a second test program and a second load program having a second load effect are combined is determined for each of a plurality of processor groups which are sorted in accordance with the difference of the connection characteristics, so as to execute another long-time load test, the second load test execution step including:

a second load test combination determination step in which execution time of the no-load state in which merely the second test program is executed by all the processors is compared with execution time of a second loaded state of the second test program when the second test program is executed by one of the processors and the second load program is executed concurrently by the remaining processors while sequentially changing the remaining processors which execute the second load program, where, if the execution time of the second loaded state is longer than the execution time of the no-load state, the second load program is determined to have a second load effect, and the second load test combination program in which the second test program and the second load program are combined is determined;

a connection characteristics sorting step in which, with respect to the second load test combination program, execution time of the second test program is measured while changing the processor which executes the second load program, and specific processors of which execution time is in particular ranges are grouped and sorted into a plurality of processor groups;

a second tuning step in which, with respect to the second load test combination program, for each of the processor groups, one of the processors is caused to execute the second test program, the remaining processors are caused to execute the second load program while changing the number of the processors, the minimum number of the processors at which the execution time of the second test program is saturated and not changed even when the number of the second load program execution processors is increased is obtained, and the minimum number of the processors is added to the second load test combination program so as to obtain a second tuned load test combination program; and a load test allocating step in which, in accordance with the second tuned load test combination program, the second test program and the second load program having a high load effect are prioritized in allocation to the processors.

4. The test method of the data processing system according to claim 3, wherein the load test allocating step comprises:

a first load test allocating step in which, if the minimum number of the processors of the second tuned load test combination program of the processor group in which the second test program is present fully uses all the processors which can execute the second load program, or if not all the processors are fully used and there is only one of the second test program, the second test program is allocated to one of the processors of the processor group, and the second load program is allocated to all the remaining processors, and, in the remaining processor groups, the second load program of the second tuned load test combination program is allocated to all the processors, so as to execute a third long-time load test;

a second load test allocating step in which, if the minimum number of the processors of the second tuned load test combination program of the processor group in which the second test program is present does not fully use all the processors which can execute the second load program and a plurality of test programs which belong to the second load test combination program of a same configuration are present, the test programs are allocated to the plurality of processors and the second load program is allocated to all the remaining processors, and, in the remaining processor groups, the second load program of the second tuned load test combination program is allocated to all the processors, so as to execute a fourth long-time load test.

5. The test method of the data processing system according to claim 3, wherein the connection characteristics sorting step comprises:

a minimum integral multiple E of $2^n$ is derived from the numbers of the processors of the plurality of the processor groups which are sorted in accordance with the execution time of the particular ranges, and the number of the processors of each of the processor groups is corrected such that the number is an integral multiple of the integral multiple E.

6. The test method of the data processing system according to claim 5, wherein the connection characteristics sorting step further comprises:

if the numbers of the processors of the plurality of processor groups which are sorted in accordance with the execution time of the particular ranges are not integral multiples of the integral multiple E, the numbers of the processors are corrected by moving the processor having execution time close to the adjacent processor group on a time axis.

7. The test method of the data processing system according to claim 1, wherein:

the first test program measures the execution time by executing a test command which examines data referencing and data write by a test processor; and the first load program executes a load command which exerts influence in terms of hardware operation by outputting operation requests including memory exclusive control, memory interleave control, bus arbitration control, and external input/output control from a load processor to the connection mechanism.

8. A computer-readable storage medium which stores a test program characterized by causing a computer which controls a data processing system in which a plurality of processors are mutually connected by one or a plurality of connection mechanisms to execute a method comprising:

a connection characteristics determination in which whether the connection mechanisms are different in connection characteristics in terms of hardware implementation or not is determined; and a first load test execution in which, if the connection characteristics of the connection mechanisms have no difference therebetween, a load test combination program in which a first test program and a first load program having a first load effect are combined is determined for all the processors, so as to execute a long-time load test; the first load test execution including:

a first load test combination determination in which execution time of a no-load state in which merely the first test program is executed by all the processors is compared with execution time of a loaded state of the first test program when the first test program is executed by one of the processors and the first load program is executed concurrently by all remaining processors, where, if the execution time of the loaded state is longer than the execution time of the no-load state, the first load program is determined to have a first load effect, and a first load test combination program is determined in which the first test program and the first load program are combined;

a first tuning in which, with respect to the first load test combination program, one of the processors is caused to execute the first test program, the remaining processors are caused to execute the first load program while changing the number of the processors, to obtain a minimum number of the processors at which the execution time of the first test program is saturated and not changed even when the number of the processors executing the first load program is increased, and the minimum number of the processors and a determination result are added to the first load test combination program to provide a first tuned load test combination program; and a load test allocation in which, in accordance with the first tuned load test combination program, the first test program and the first load program having a high load effect are prioritized in allocation to the processors.

9. The storage medium according to claim 8, wherein the load test allocation comprises:

a first load test allocating in which, if the minimum number of the processors of the first tuned load test combination program fully uses all the processors which can execute the first load program, or if not all the processors are fully used and there is only one of the first test program, the first test program is allocated to one of the processors, and the first load program is allocated to all the remaining processors, so as to execute a first long-time load test; and a second load test allocating in which, if the minimum number of the processors of the first tuned load test combination program does not fully use all the processors which can execute the first load program and a plurality of test programs which belong to the first load test combination program of a same configuration are present, the test programs are allocated to the processors and the first load program is allocated to all the remaining processors, so as to execute a second long-time load test.

10. The storage medium according to claim 8, further comprising a second load test execution in which, if the connection characteristics of the connection mechanisms have a difference therebetween, a second load test combination program in which a second test program and a second load program having a second load effect are combined is determined for each of a plurality of processor groups which are sorted in accordance with the difference of the connection characteristics, so as to execute another long-time load test, the second load test execution including:

a second load test combination determination in which execution time of the no-load state in which merely the second test program is executed by all the processors is compared with execution time of a second loaded state of the second test program when the second test program is executed by one of the processors and the second load program is executed concurrently by the remaining processors while sequentially changing the remaining processors which execute the second load program, where, if the execution time of the second loaded state is longer than the execution time of the no-load state, the second load program is determined to have a second load effect, and the second load test combination program in which the second test program and the second load program are combined is determined;

a connection characteristics sorting in which, with respect to the second load test combination program, execution time of the second test program is measured while changing the processor which executes the second load program, and the processors of which execution time is in particular ranges are grouped and sorted into a plurality of processor groups;

a second tuning in which, with respect to the second load test combination program, for each of the processor groups, one of the processors is caused to execute the second test program, the remaining processors are caused to execute the second load program while changing the number of the processors, the minimum number of the processors at which the execution time of the second test program is saturated and not changed even when the number of the second load program execution processors is increased is obtained, and the minimum number of the processors is added to the second load test combination program so as to obtain a second tuned load test combination program; and a load test allocating in which, in accordance with the second tuned load test combination program, the second test program and the second load program having a high load effect are prioritized in allocation to the plurality of processors.

11. The storage medium according to claim 10, wherein the load test allocating comprises:

a first load test allocating in which, if the minimum number of the processors of the second tuned load test combination program of the processor group in which the second test program is present fully uses all the processors which can execute the second load program, or if not all the processors are fully used and there is only one of the second test program, the second test program is allocated to one of the processors of the processor group, and the second load program is allocated to all the remaining processors, and, in the remaining processor groups, the second load program of the second tuned load test combination program is allocated to all the processors, so as to execute a third long-time load test;

a second load test allocating in which, if the minimum number of the processors of the second tuned load test combination program of the processor group in which the second test program is present does not fully use all the processors which can execute the second load program and a plurality of test programs which belong to the second load test combination program of a same configuration are present, the test programs are allocated to the plurality of processors and the second load program is allocated to all the remaining processors, and, in the remaining processor group, the second load program of the second tuned load test combination program is allocated to all the processors, so as to execute a fourth long-time load test.

12. The storage medium according to claim 11, wherein the connection characteristics sorting comprises:

a minimum integral multiple E of $2^n$ is derived from the numbers of the processors of the plurality of the processor groups which are sorted in accordance with the execution time of the particular ranges, and the number of the processors of each of the processor groups is corrected such that the number is an integral multiple of the integral multiple E.

13. The storage medium according to claim 12, wherein the connection characteristics sorting further comprises:

if the numbers of the processors of the plurality of processor groups which are sorted in accordance with the execution time of the particular ranges are not integral multiples of the integral multiple E, the numbers of the processors are corrected by moving the processor having execution time close to the adjacent processor group on a time axis.

14. The storage medium according to claim 8, wherein:

the first test program measures the execution time by executing a test command which examines data referencing and data write by a test processor; and the first load program executes a load command which exerts influence in terms of hardware operation by outputting operation requests including memory exclusive control, memory interleave control, bus arbitration control, and external input/output control from a load processor to the connection mechanism.

15. A test device of a data processing system in which a plurality of processors are mutually connected by one or a plurality of connection mechanisms, the test device executing:

a connection characteristics determination unit in which whether the connection mechanisms are different in connection characteristics in terms of hardware implementation or not is determined; and a first load test execution unit in which, if the connection characteristics of the connection mechanisms have no difference therebetween, a load test combination program in which a first test program and a first load program having a first load effect are combined is determined for all the processors, so as to execute a long-time load test, the first load test execution unit including:

a first load test combination determination unit in which execution time of a no-load state in which merely the first test program is executed by all the processors is compared with execution time of a loaded state of the first test program when the first test program is executed by one of the processors and the first load program is executed concurrently by all remaining plural processors, where, if the execution time of the loaded state is longer than the execution time of the no-load state, the first load program is determined to have a first load effect, and a first load test combination program is determined in which the first test program and the first load program are combined;

a first tuning unit in which, with respect to the first load test combination program, one of the processors is caused to execute the first test program, the remaining processors are caused to execute the first load program while changing the number of the processors, to obtain a minimum number of the processors at which the execution time of the first test program is saturated and not changed even when the number of the processors executing the first load program is increased, and the minimum number of the processors and a determination result are added to the first load test combination program to provide a first tuned load test combination program; and a load test allocating unit in which, in accordance with the first tuned load test combination program, the first test program and the first load program having a high load effect are prioritized in allocation to the processors.

16. The test device according to claim 15, further comprising a second load test execution unit in which, if the connection characteristics of the connection mechanisms have a difference therebetween, a second load test combination program in which a second test program and a second load program having a second load effect are combined is determined for each of a plurality of processor groups which are sorted in accordance with the difference of the connection characteristics, so as to execute a long-time another load test, the second load test execution unit including:

a second load test combination determination unit in which execution time of the no-load state in which merely the second test program is executed by all the processors is compared with execution time of a second loaded state of the second test program when the second test program is executed by one of the processors and the second load program is executed concurrently by the remaining processors while sequentially changing the remaining processors which execute the second load program, where, if the execution time of the second loaded state is longer than the execution time of the no-load state, the second load program is determined to have a second load effect, and the second load test combination program in which the second test program and the second load program are combined is determined;

a connection characteristics sorting unit in which, with respect to the second load test combination program, execution time of the second test program is measured while changing the processor which executes the second load program, and specific processors of which execution time is in particular ranges are grouped and sorted into a plurality of processor groups;

a second tuning unit in which, with respect to the second load test combination program, for each of the processor groups, one of the processors is caused to execute the second test program, the remaining processors are caused to execute the second load program while changing the number of the processors, the minimum number of the processors at which the execution time of the second test program is saturated and not changed even when the number of the second load program execution processors is increased is obtained, and the minimum number of the processors is added to the second load test combination program so as to obtain a second tuned load test combination program; and a load test allocating unit in which, in accordance with the second tuned load test combination program, the second test program and the second load program having a high load effect are prioritized in allocation to the processors.

* * * * *

UNITED STATES PATENT AND TRADEMARK OFFICE
CERTIFICATE OF CORRECTION

| | | |
|---|---|---|
| PATENT NO. | : 7,483,817 B2 | Page 1 of 1 |
| APPLICATION NO. | : 11/516786 | |
| DATED | : January 27, 2009 | |
| INVENTOR(S) | : Masaru Mishuku | |

It is certified that error appears in the above-identified patent and that said Letters Patent is hereby corrected as shown below:

Column 30, Line 19, change "claim 11," to --claim 10,--.

Signed and Sealed this

Thirty-first Day of March, 2009

JOHN DOLL
*Acting Director of the United States Patent and Trademark Office*